3,353,821
PLY SEPARATOR CONVEYOR
Robert E. Smith, Chicago, Robert L. Kosrow, Elk Grove Village, and John G. Attwood, Oak Park, Ill., assignors to Union Special Machine Company, Chicago, Ill., a corporation of Illinois
Filed June 8, 1965, Ser. No. 462,795
16 Claims. (Cl. 271—16)

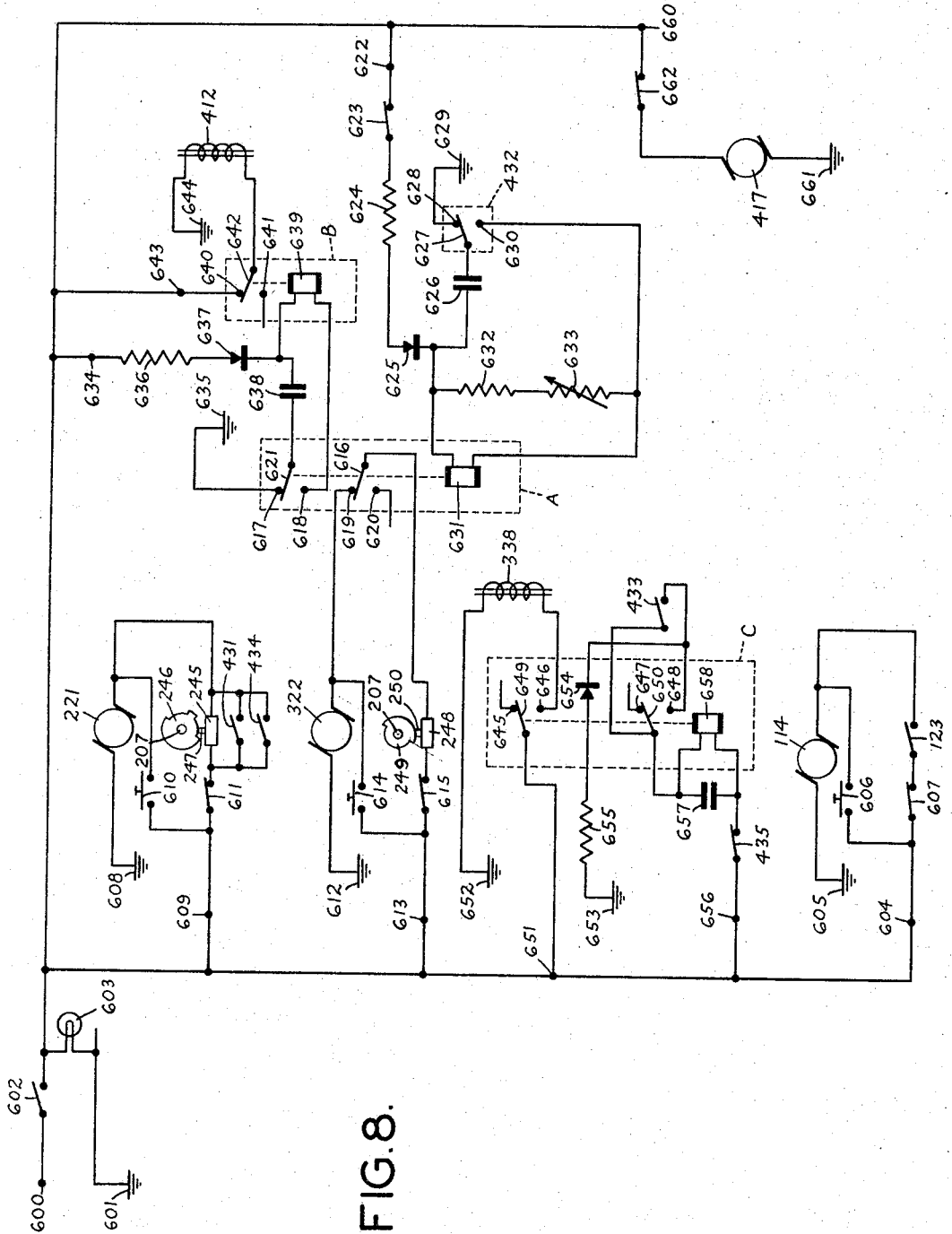

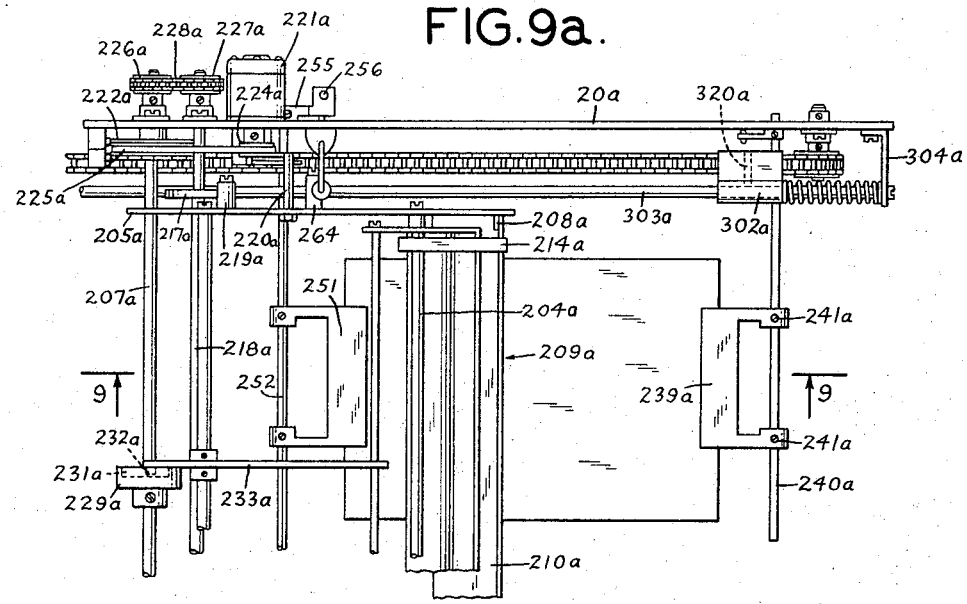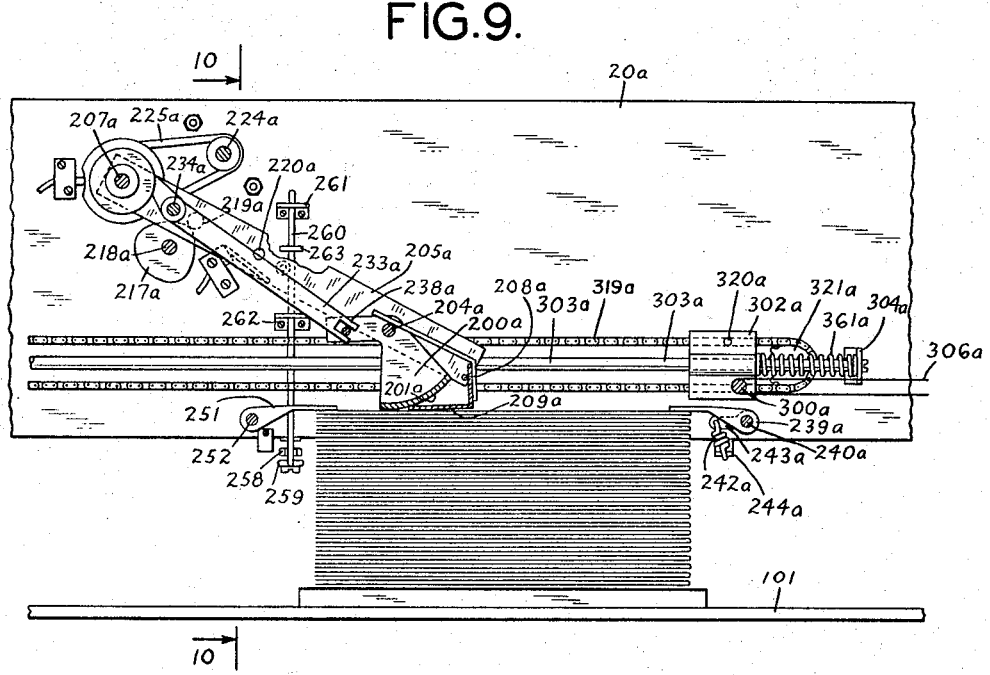

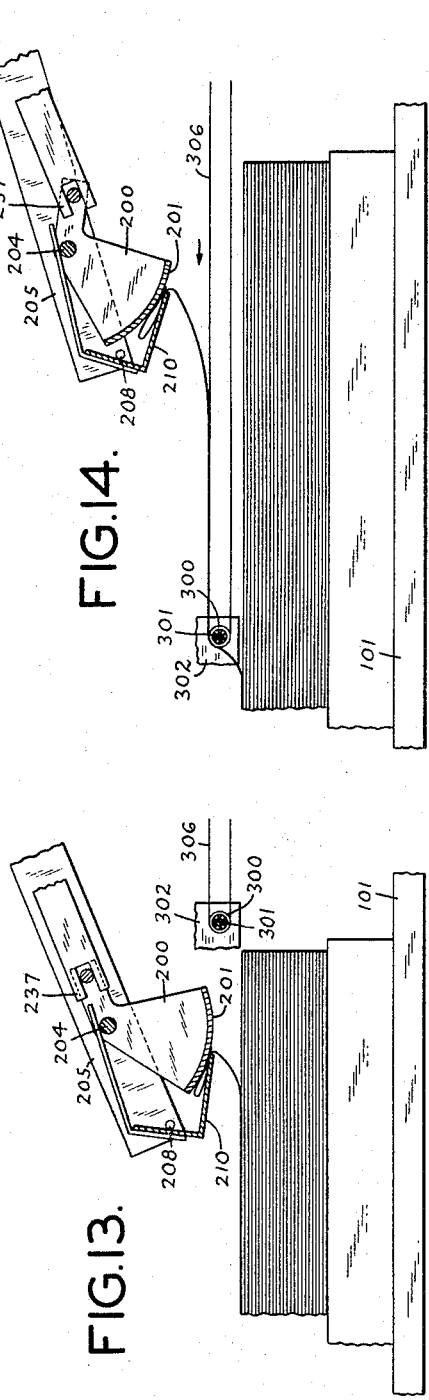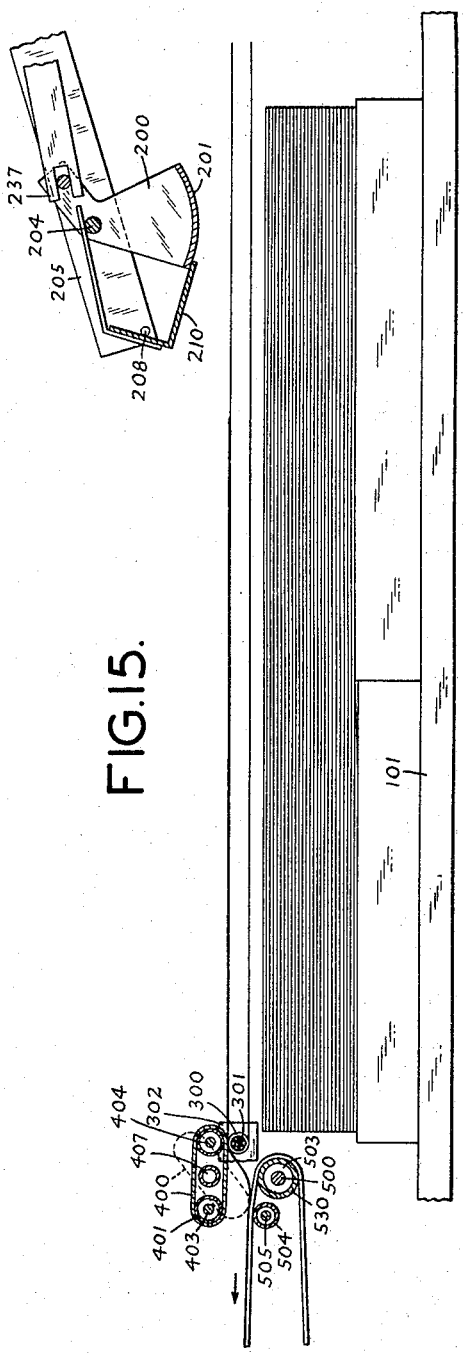

ABSTRACT OF THE DISCLOSURE

Apparatus for separating flat flexible material work pieces from a stack of such work pieces having a frictional clamping mechanism for lifting a portion of the top work piece off the stack. The apparatus also includes separator means for lifting the remaining portion of the top work piece off the stack and for supporting the top work piece above the stack when released by the clamping mechanism, conveyor means for moving the separated work pieces to a receiving station, and transfer means for moving such work pieces from the separator means to the conveyor means. Electrical circuitry is provided for controlling the operation of the apparatus.

---

The present invention relates to apparatus for handling flexible sheet material work pieces such as fabric sections. More particularly it relates to a novel and improved apparatus for separating such work pieces from a stack and for conveying such separated work pieces to a receiving station including a further work handling device such as a sewing apparatus.

The apparatus of this invention is particularly useful in the garment industry, or needle trade, where it is the practice to cut work piece sections from multiple plies of material so that a plurality of such sections are cut simultaneously forming a stack. Progress in the development of pick up devices for reliably separating individual work pieces from a stack has been comparatively slow, and the industry does not yet have available a truly dependable machine for automatically performing this function. An incredible amount of costly labor time is wasted when the separating operation is done by hand, and though devices heretofore devised for separating stacked work pieces use a variety of techniques such as suction, air blast, adhesive tape or hook and barb means, not much if any headway has been made in achieving substantial savings in labor cost or increasing production efficiency.

It is therefore one object of this invention to provide an apparatus for reliably separating work pieces individually from a stack automatically.

Another object of the invention is to provide an apparatus having the foregoing characteristics with the ability to automatically convey work pieces to a receiving station in a regular succession or sequence as they are separated from the stack.

Still another object of the invention is to provide an apparatus having the foregoing characteristics with the ability to handle work pieces of different dimensions.

A further object of the invention is to provide an apparatus having the foregoing characteristics with a self-programing ability so that the various stages and movements of the mechanism will be carried out and performed in an automatic sequence of operational steps without the need for supervision by an operator.

Various other objects and advantages will appear from the description hereinafter of two highly desirable embodiments of the invention, and their novel features will be particularly pointed out in the appended claims.

Among other features, the apparatus constructed in accordance with the invention includes five inter-related mechanisms which cooperate with each other via a complex electrical circuit incorporating various switches for placing electrical motors and solenoids into and out of circuit with a source of electrical power. These mechanisms are, (1) a self-leveling stack support platform; (2) a ply ruffler mechanism; (3) a separator mechanism; (4) a transfer mechanism; and (5) a conveyor mechanism.

In operation of the apparatus a stack of garment sections is placed on the self-leveling stack support platform which keeps the top of the stack at an appropriate height for proper engagement of the uppermost section by the ply ruffler mechanism. The ply ruffler partially separates the top work piece from the stack in four separate steps as follows: (1) the mechanism is lowered onto the top of the stack; (2) it seizes and ruffles an end portion of the top ply into a loop grasping it tightly; (3) the mechanism then is raised off of the stack, lifting the ruffled loop with it; and (4) it later releases the seized loop. This last step, however, does not occur until the separator mechanism has begun operating and has completed separating the remainder of the work piece from the stack.

The separator mechanism includes a separator bar which performs the function of separating the remainder of the work piece from the stack, and a string grill which is connected to and pulled behind the separator bar. The function of the string grill is to support the work piece above the stack after being separated from it, and to maintain the seized loop above the stack after it is released from the ruffler mechanism. In addition it tends to move the work piece towards the transfer mechanism as will be explained more fully hereinafter in connection with the detailed description of the invention.

The transfer mechanism includes an endless belt for transferring the work piece from the string grill onto the conveyor mechanism. This belt is quite short and has two operating positions. In one of them it contacts the work piece from above and frictionally pulls it part way off the string grill. In the other, it clamps the leading edge of the work piece firmly onto the conveyor mechanism which pulls it the rest of the way off the string grill and carries it to a receiving station at the delivery end of the apparatus.

The conveyor mechanism includes a plurality of endless belts which are spaced one from another to provide a wide carrying and supporting area for the work piece. In addition, as will be described more fully hereinafter, the conveyor mechanism is unique in that its conveying surface, i.e., the upper runs of the endless conveying belts can be lengthened or shortened at will by making a very simple adjustment of the mechanism. This enables the apparatus to handle work piece stacks of various dimensions and is quite a useful feature.

For a more complete understanding reference is made to the detailed description of the invention, which follows hereinafter, and to the drawings in which:

FIG. 3a is a sectional fragmentary view along line 3a—3a of FIG. 1 showing the chain drive for the transfer mechanism;

FIG. 8 is a diagram of electrical circuitry for both embodiments of the apparatus;

FIG. 9 is a longitudinal vertical section taken through a portion of a second embodiment of the invention. It is similar to the first embodiment, but the ruffler mechanism is shown adjacent the left hand end of the stack instead of the right hand end to facilitate the handling of folded work pieces;

FIG. 9a is a top plan view of the apparatus forming the embodiment shown in FIG. 9;

FIGS. 11, 12, 13, 14 and 15 are diagrammatic illustrations showing the ruffling and separating operation of the first embodiment in five stages.

Figure 1:
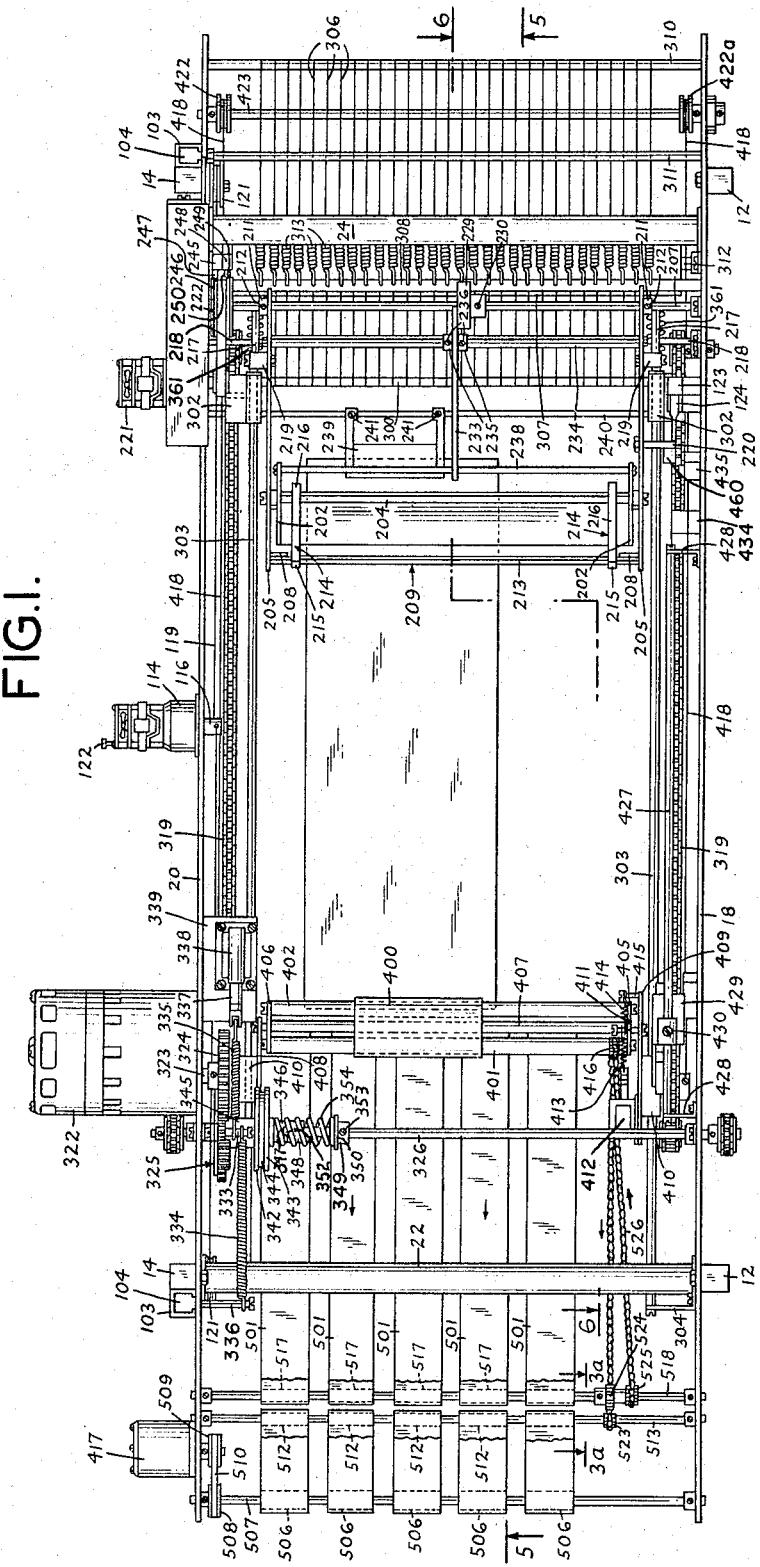
FIG. 1 is a top plan view of the first embodiment of the apparatus for separating unfolded work pieces from a stack.

Referring now to FIGS. 1 and 3–5 of the drawings the apparatus is shown mounted on a rigid frame structure which includes two front posts 12 and two rear posts 14 spaced rectangularly from one another and mounted on a bottom plate 16. At an upper portion of front posts 12 a front plate 18 is mounted, and at a similar upper portion of rear posts 14 a rear plate 20 is mounted. Plates 18 and 20 serve mainly as support means for the various principal components of the apparatus and are rigidly secured to each other adjacent opposite ends of the apparatus by two tubular braces 22 and 24. Braces 22, 24 may be welded directly to the plates if desired. A number of additional elements such as bars and brackets are connected to this frame structure to give it rigidity and to assist in supporting various devices. Most of these elements will be mentioned hereinafter in connection with the additional functions which they perform in the apparatus.

Self-leveling stack platform elevator

Figure 3:
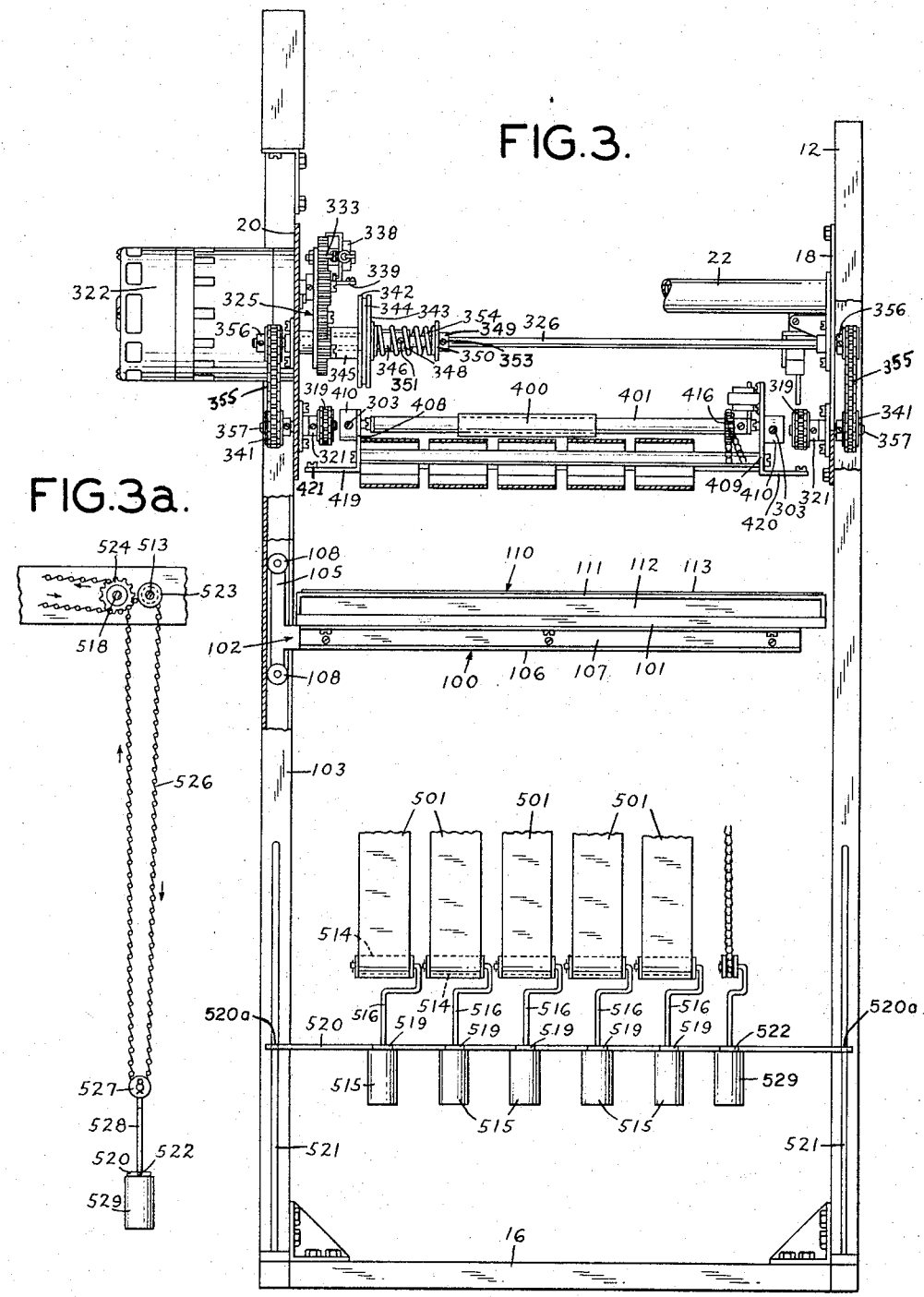
FIG. 3 is a side elevational view of the apparatus of FIG. 1, as seen from the left of that figure, with certain portions shown in section and others broken away.
Figure 4:
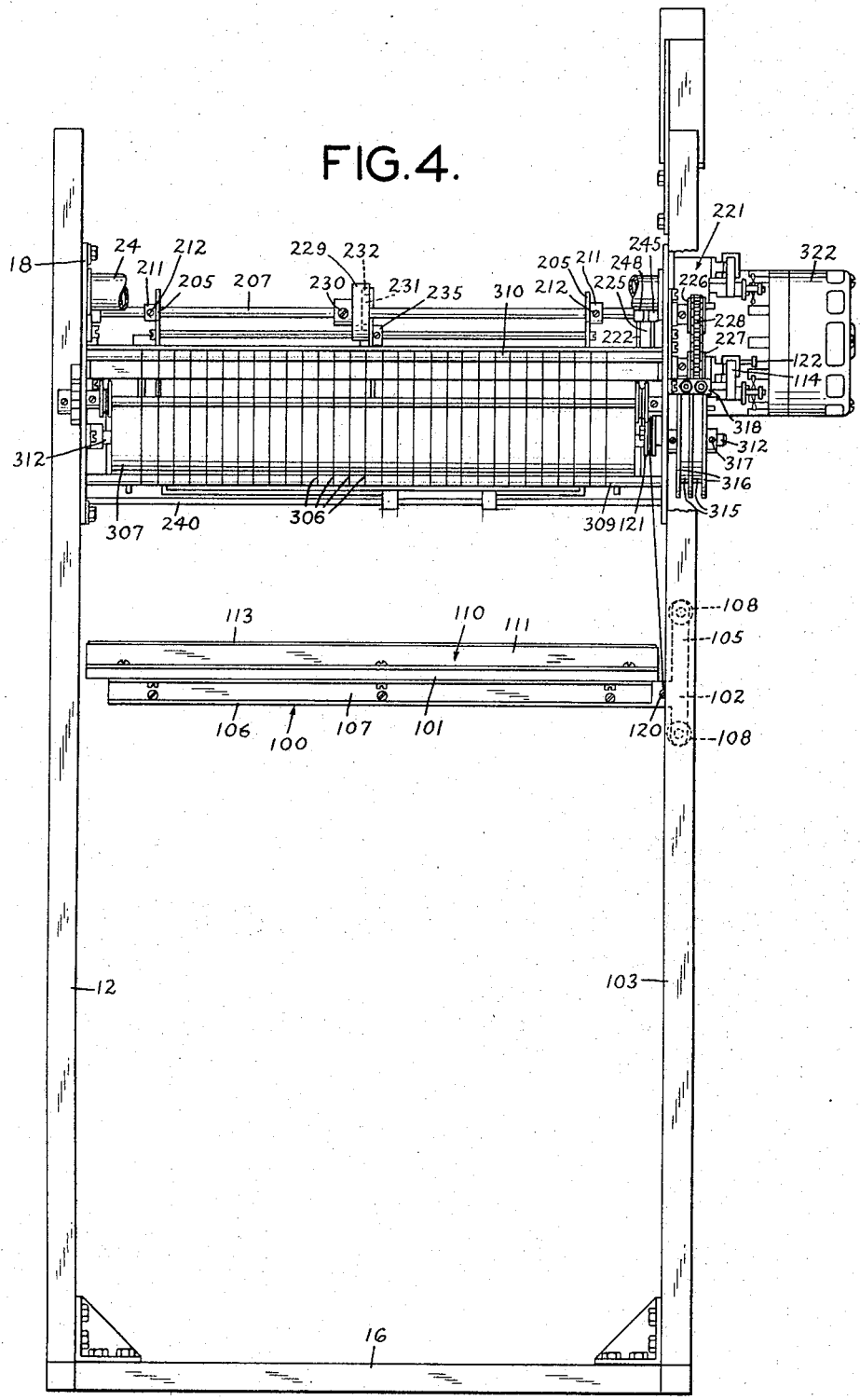
FIG. 4 is a side elevational view of the apparatus of FIG. 1 as seen from the right of FIG. 1.

The stack platform elevator 100 includes a baseboard 101 which is supported adjacent its opposite ends by T-shaped brackets 102 (see FIGS. 3 and 4). Brackets 102 are each slidable within a vertical channel 104 contained in two upright members 103. Each bracket 102 has a vertical portion 105 and a horizontal portion 106. A vertical slot 109 (see FIG. 5) in channels 104 permits bracket horizontal portions 106 to protrude from upright members 103 and to support baseboard 101 by means of angle irons 107.

Figure 5:
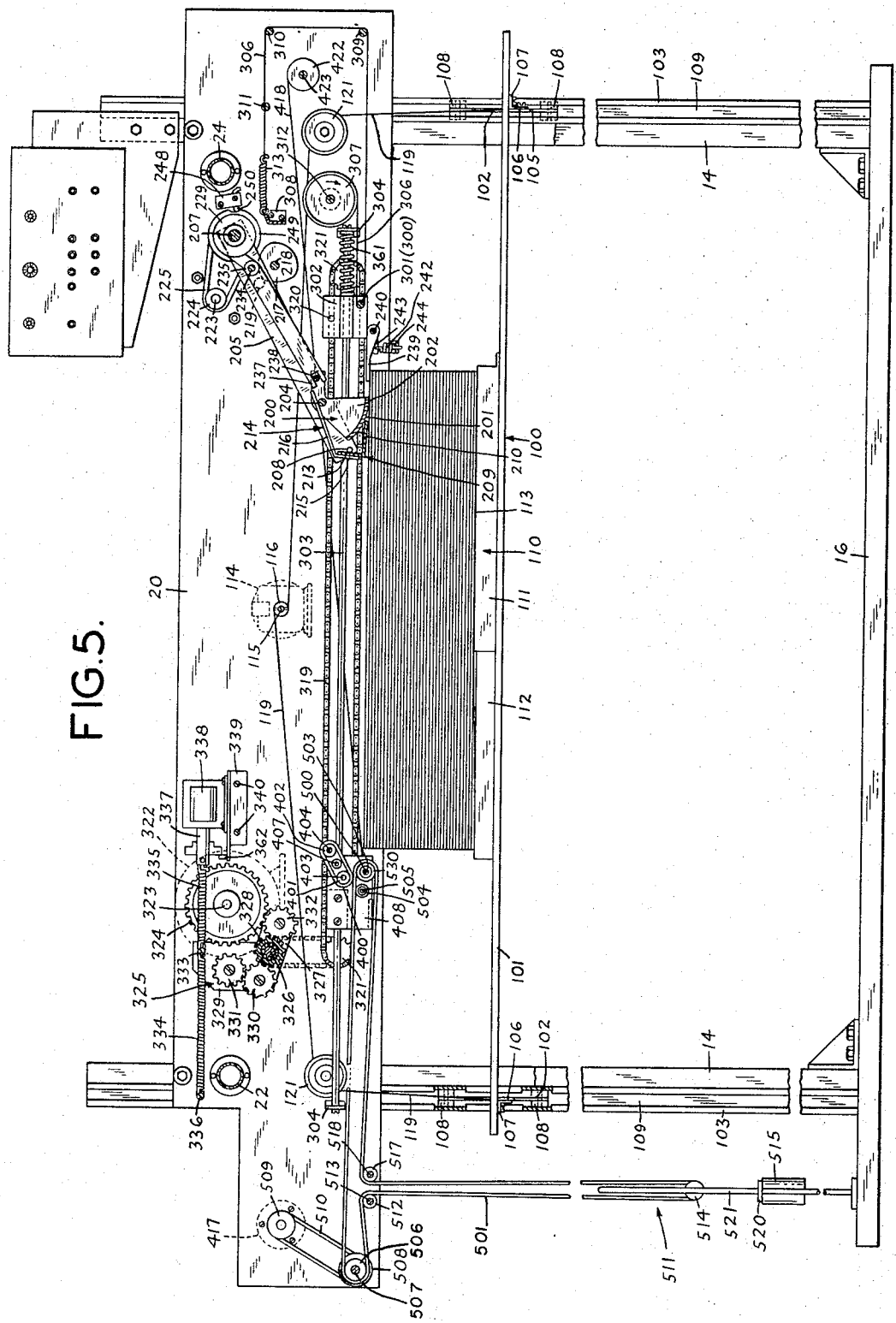
FIG. 5 is a sectional view of the apparatus of FIG. 1 taken along line 5—5 of that figure with the separator bar clutch mechanism removed for a clearer view of the driving gear and associated parts.

Vertical portions 105 are contained within channels 104 by roller pairs 108 mounted on the top and bottom ends of portions 105 so as to facilitate the raising and lowering of brackets 102 within the channels. Upright members 103 are secured to the frame structure via rear posts 14, but are spaced somewhat further apart than such posts, by virtue of being secured respectively to the left and right faces of such posts, as seen in FIG. 5, or are otherwise secured to the frame structure adjacent said posts.

Mounted on baseboard 101 is an adjustable stack bed 110 on which the work piece stack is carried. Stack bed 110 includes a stationary portion 111, and at least one movable portion 112 which is adapted to be telescoped into and out of the stationary portion to increase or decrease the length of the stack bed. The stack bed 110 also provides an elevated support for the stack with respect to baseboard 101 so that even the last work piece in the stack can be raised to the proper level for removal and transfer to the conveyor mechanism. A felt layer 113 is preferably provided on the top of stationary portion 111 of the stack bed so as to keep the stack from sliding.

Stack platform 100 is raised and lowered by an electric motor 114 which is mounted on the outer face of rear plate 20. Motor 114 has a shaft 115 extending through the rear plate a slight distance toward front plate 18. Mounted on the end of this shaft adjacent rear plate 20 is a windup drum 116, and connecting the motor 114 with T-shaped brackets 102 is a steel wire 119. Wire 119 is connected at its opposite ends to brackets 102 by screws 120. From each bracket 102 wire 119 rises approximately vertically and passes over a rotatable pulley 121 which is mounted adjacent the inner face of rear plate 20 opposite rear posts 14. From there the wire 119 passes toward the center of the apparatus into cooperation with windup drum 116. A bore (not shown) passes through both the windup drum and motor shaft 115 perpendicular to the axis of the latter, so that the central portion of wire 119 may be passed through it. Perpendicularly intersecting the bore mentioned is a set screw (not shown) which locks the central portion of wire 119 in a fixed position in the bore. Rotation of motor shaft 115 causes the two branches of the wire 119 to be wound onto windup drum 116 and to be unwound therefrom according to the direction in which shaft 115 is rotated. Energization of motor 114 winds each of the branches of wire 119 onto the drum thereby raising platform 100. The platform cannot be lowered, however, without operating hand releasable magnetic brake means 122 which keeps shaft 115 from rotating backwards, when the motor is off, by the gravitational pull of the stack loaded platform 100.

Figure 6:
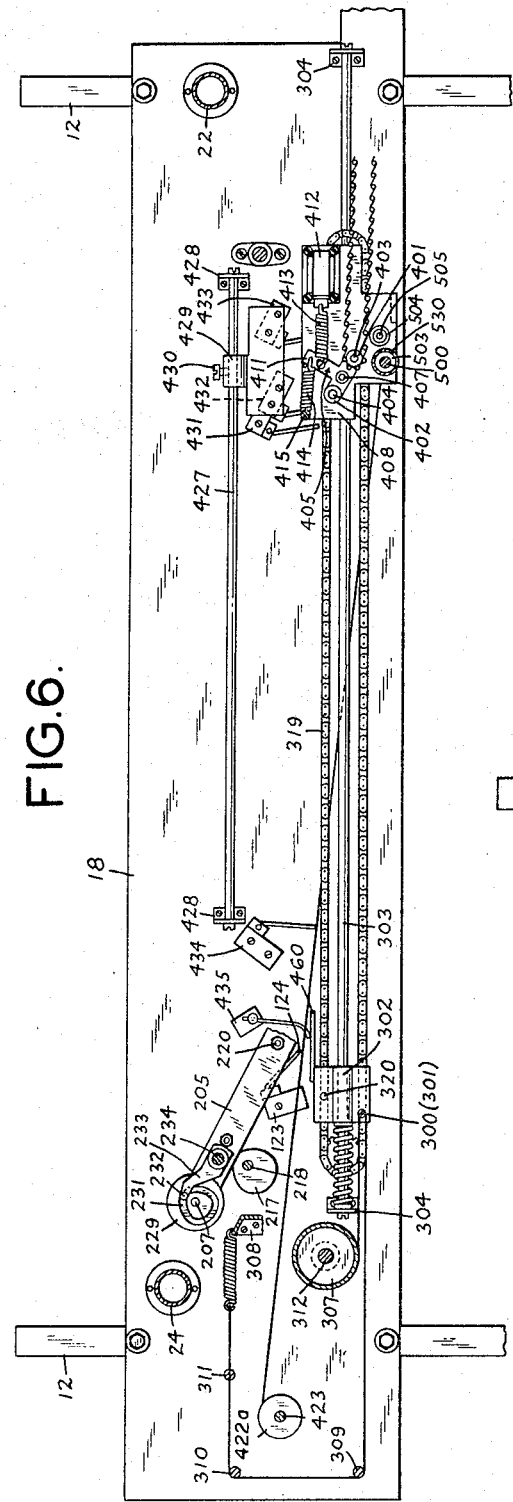
FIG. 6 is a sectional view of the apparatus of FIG. 1 taken along the line 6—6 of that figure with the conveyor mechanism and portions of the ruffler mechanism omitted.

Motor 114 is energized according to the condition of a normally open one-way switch 123 which is mounted on the inner face of front plate 18 as shown in FIG. 6. Switch 123 has a contact arm 124 which operates the switch when contacted by a portion of the ruffler mechanism which is hereinafter described.

Ruffler mechanism

The ruffler includes a ruffing plate 200 which has an arcuate underface 201 and two side walls 202. Underface 201 comprises a high friction surface such as sandpaper, emery paper, or certain kinds of rubber or the like. Side walls 202 are elbow shaped as seen in FIG. 5 and are pivotally suspended from a fulcrum shaft 204 passing through the side walls at both elbows. Fulcrum shaft 204 is fastened at its opposite ends to swing arms 205, which are pivotally swingable about a ruffler drive shaft 207 which is rotatably journaled between front and rear plates 18, 20. A pair of collars 211 are provided adjacent swing arms 205 to prevent them from moving horizontally along drive shaft 207. The position of each of the collars 211 is adjustable along shaft 207 and may be retained in the desired position by means of set-screws 212.

The other or free ends of the swing arms 205 carry a clamping plate 209 which is attached to the swing arms 205 by hinge pins 208 which are welded to opposite ends of the clamping plate (see FIG. 1). Hinge pins 208 are freely rotatable in the ends of swing arms 205, but leaf springs 214 normally keep the clamping plate 209 in a fixed position in which its horizontally extending bottom portion 210 is maintained in contact with the arcuate underface 201 of ruffing plate 200. This is done by affixing the vertical shanks 215 of the leaf springs 214 to a vertically extending side portion 213 of clamping plate 209, and by positioning the horizontal shank portions 216 (see FIGS. 1 and 5) of leaf springs 214 against the top of fulcrum shaft 204. Leaf springs 214 are normally bent into an acute angle so that when extended to an obtuse angle and placed on top of fulcrum shaft 204, as seen in FIG. 5, the clamping plate bottom portion 210 will be urged into contact with ruffling plate underface 201.

The pivoting motion of swing arms 205 about shaft 207 is controlled by a pair of lift cams 217, mounted on a ruffler lift shaft 218 which is rotatably journaled between front and rear walls 18, 20. Mounted on swing arms 205 intermediate fulcrum shaft 204 and ruffler drive shaft 207 are a pair of cam followers 219 which rest on lift cams 217 and move swing arms 205 up and down according to the profile of the cams. Lift cams 217 have a low dwell zone in which their profile is at a constant radius from the center of cam shaft 218. During the time when followers 219 contact this portion of the profile the swing arms 205 reach their lowest point and stay there until the cam profile begins to rise again. Positive engagement of cam followers 219 with lift cams 217 is normally insured by the weight of ruffling plate 200 and clamping plate 209 carried at the end of the swing arms 205.

If platform 100 has a stack of work pieces on it and is at the appropriate height to separate the plies in the stack the swing arms will not descend to their lowest point, but will descend only until the ruffing plate 200 and clamping plate 209 come to rest on the top of the stack. When this occurs, the cam followers 219 will halt their downward movement and will not descend to the limit set by lift cams 217.

As mentioned hereinbefore, raising and lowering the ruffler mechanism causes switch 123 to be actuated. This is accomplished by providing a pin 220 on the swing arm adjacent front plate 18. Pin 220 is positioned above switch 123 between cam follower 219 and fulcrum shaft 204, and extends toward front plate 18. During the downward movement of swing arms 205 pin 220 will contact switch arm 124 and actuate switch 123.

If the ruffler mechanism settles on the top of the stack before the switch has been actuated swing arms 205 will not have moved down far enough to permit pin 220 to contact switch arm 124, switch 123 will remain open and platform motor 114 will not be started. In this way, when the top of the stack is high enough for separating work pieces platform motor 114 will not operate at all. When the top of the stack gets low enough, however, pin 220 will actuate switch 123 and start platform motor 114 thereby raising the plaform. Once started in this manner motor 114 will continue to run until pin 220 is raised out of contact with switch arm 124 and switch 123 returns to its normally open position. When starting the apparatus if platform 100 is much lower than it should be then cams 217 will lift pin 220 away from switch 123 before the platform is high enough to enable the ruffler to begin separating the plies. Should this happen it may take several revolutions of cam shaft 218, i.e., several cycles of the ruffler mechanism before platform 100 reaches its proper height. During each such cycle the platform will be raised a small amount according to the length of time the switch 123 is actuated. Once the platform has reached its proper height, however, pin 220 will actuate switch 123 to keep the top of the stack at the appropriate height.

There are other ways to start platform motor 114, but these will be discussed hereinafter in connection with the description of the operation of the apparatus after the description of the circuitry has been provided.

Lift cam shaft 218 is rotated by a ruffler motor 221 by means of a linkage (see FIGS. 1, 2 and 5) which includes a pulley 222 rigidly mounted on shaft 207 adjacent rear plate 20, a motor pulley 224 mounted on the end of a shaft 223 from motor 221, and a belt 225 trained around pulleys 222, 224. The linkage also includes two sprocket wheels 226, 227 rigidly mounted on extensions of shafts 207 and 218 respectively, which pass through rear plate 20, and a chain 228 which is trained around both sprocket wheels. Rotation of shaft 218 is synchronized by this linkage to the rotation of shaft 207, the two together controlling the operational cycle of the ruffler mechanism.

Aside from transmitting the power to raise and lower the ruffler mechanism, however, drive shaft 207 controls the operation of ruffling plate 200. This is accomplished by a grooved cam 229 (see FIGS. 4 and 6) rigidly mounted near the middle of shaft 207 by screw means 230. Cam 229 has a profile groove 231 into which a cam follower 232 is fitted. Cam follower 232 is mounted on one end of a ruffler actuating lever 233 which is pivoted about a fulcrum shaft 234 between the two ends of the latter, and fulcrum shaft 234 is rigidly mounted at its two ends in swing arms 205 at a point between cam followers 219 and ruffler drive shaft 207. Ruffler actuating lever 233 is prevented from moving horizontally on fulcrum shaft 234 by two collars 235 having set-screws 236 to fix their position on the shaft.

The other end of ruffler actuating lever 233 comprises a forked end 237 as seen in FIGS. 5 and 11–15. Forked end 237 surrounds a pivoting lever bar 238 which is rigidly mounted adjacent its ends in ruffling plate side walls 202 between fulcrum shaft 204 and fulcrum shaft 234. In this way as cam 229 rotates, ruffling plate 200 will be pivoted about fulcrum shaft 204.

Since ruffler drive shaft 207 and lift cam shaft 218 are synchronized with each other it should be clear that as swing arms 205 go through a complete descending and rising cycle ruffling plate 200 will go through a complete operating cycle. The profile of cam groove 231 is so arranged that during the descending movements of swing arms 205 arcuate underface 201 remains stationary with respect to clamping plate 209. At the bottom of this descending motion clamping plate bottom portion 210 and arcuate underface 201 rest on the top of the stack and prevent it from sliding horizontally in one direction or another. Both clamping plate 209 and arcuate underface 201 are in frictional contact with the top work piece ply in the stack under these conditions.

As soon as they come to rest on the top of the stack the profile of cam groove 231 acts to pivot actuating lever 233 about fulcrum shaft 234, thereby lowering forked end 237 (see FIGS. 12–14) causing arcuate underface 201 to ruffle up the end portion of the top work piece and to slide the latter over the top edge of bottom portion 210 of clamping plate 209 thereby forming and clamping a loop at the end portion of top work piece ply. The downward pressure of clamping plate 209 on the stack tends to prevent the main portion of the top ply in the stack from moving as the ruffling plate 200 pivots about fulcrum shaft 204. The end portion of the top ply which is in contact with arcuate underface 201 is not engaged by the clamping plate and so is free to move with said underface as it slides over the free edge of bottom portion 210. The frictional contact between the top ply and the arcuate underface causes the ply to move in the manner indicated.

As an aid in ensuring that only the top ply in the stack moves with ruffling plate 200 a stiffening plate 239 is provided at the right hand edge of the stack as seen in FIGS. 1 and 5. Stiffening plate 239 is mounted on a shaft 240 by means of screws 241 which adjustably but rigidly connect the two together. Shaft 240 is rotatably journaled between front and rear plates 18, 20 and has a crank arm 243 rigidly mounted on it adjacent plate 20. Connected to crank arm 243 is one end of a tension spring 242 the other end of which is connected to a bracket 244 mounted on rear plate 20. Tension spring 242 pulls on crank arm 243 in such a way as to cause stiffening plate 239 to exert a slight downward pressure on the edge of the stack. This not only facilitates the ruffling of a portion of the top ply into a loop by maintaining the stack in a stable position, it also helps prevent the next lower ply from being moved as the top ply is pulled away from the edge by the arcuate underface 201. As shown in FIGS. 13 and 14 as ruffling plate 200 is pivoted about fulcrum shaft 204 the work piece is ruffled into a larger and larger loop. At the same time, however, lift cams 217 contact cam followers 219 again and begin pivoting swing arms 205 upwardly about shaft 207. Since the loop is held firmly between the clamping plate 209 and ruffling plate 200 during this movement a portion of the top ply is lifted above the stack with a kind of peel-off action.

Referring again to FIGS. 1 and 5 ruffler motor 221 is partially controlled by a normally open switch 245 mounted on rear plate 20 adjacent pulley 222 on shaft 207. Switch 245 is cam actuated by a ruffler cam 246 (see FIG. 1) mounted on pulley 222 adjacent rear plate 20. Cam 246 has two high dwell zones (see FIG. 8) for closing switch 245 and actuating motor 221, and two low dwell zones for permitting ruffler switch 245 to return to its normally open position. Ruffler switch 245 has a cam follower 247 which moves in accordance with the profile of cam 246 closing and opening the switch. Other switches to be described hereinafter also control ruffler motor 221 so that it may be started and stopped in accordance with the needs of the apparatus.

Mounted on ruffler switch 245, and in the direction of front plate 18 is another switch 248 for controlling the separator mechanism. Switch 248 is also normally open and operated by a cam 249 engaged by a follower 250 of the switch. Cam 249 is mounted on the side of pulley 222 facing front plate 18, and has one high dwell zone and one low dwell zone as seen in FIG. 8. These zones are so positioned with respect to the zones of cam 246 that at the instant that switch 245 is allowed to reopen by cam 246, switch 248 is closed by cam 249 thereby starting the separator mechanism.

*Separator mechanism*

Referring again to FIGS. 1, 3, 5 and 6 the separator mechanism includes a separator bar sleeve 300 mounted on a separator bar shaft 301 by bearings (see FIGS. 11–14). Sleeve 300 and its bearings are not shown in FIGS. 1 and 5 due to the scale of the drawings. Shaft 301 is fixedly connected at its ends in suitable bores (not shown) in two separator bar brackets 302. One bracket 302 is slidably arranged on a guide rail or rod 303 which is spaced from but parallel with front plate 18. The other bracket 302 is similarly arranged on a guide rail 303 spaced from but parallel to rear plate 20. Both guide rails are affixed to their adjacent plates 18, 20 by means of mounting brackets 304 which support guide rails 303 at their ends (see FIGS. 1 and 6). At the right hand end of each of guide rails 303, as seen in FIGS. 1 and 5, there is a compression spring 361 which serves as a shock absorber for separator bar brackets 302 at the end of their return travel from the left hand end of the apparatus.

Sleeve 300 has a plurality of annular guide grooves (not shown) on it preferably spaced equally apart as part of the structure for supporting the string grill portion of the separator mechanism. This portion includes a plurality of strings 306 long lengths of which are stored on a windup cylinder 307 as best seen in FIG. 5. Strings 306 extend from windup cylinder 307 around separator bar sleeve 300 in grooves (not shown) to a fastening bracket 308 after passing around a lower turn bar 309 and an upper turn bar 310, and from there through a spacer bar 311. Windup cylinder 307 is rigidly mounted on a rotatable shaft 312 journaled in suitable bearings (not shown) in plates 18, 20. Turn bars 309, 310 are rigidly mounted between plates 18, 20 at their right hand end as seen in FIG. 5, as are spacer bar 311 and fastening bracket 308.

Strings 306 are connected to bracket 308 by tension springs 313. Spacer bar 311 is mounted between bracket 308 and turn bar 310 and contains a plurality of spaced grooves or holes (not shown) for maintaining strings 306 as desired distance from each other to prevent their becoming entangled. For the same purpose and to keep the strings 306 spaced according to the distance between the grooves (not shown) on sleeve 300 the turn bars 309, 310 are preferably also formed with similar grooves (not shown).

Figure 2:
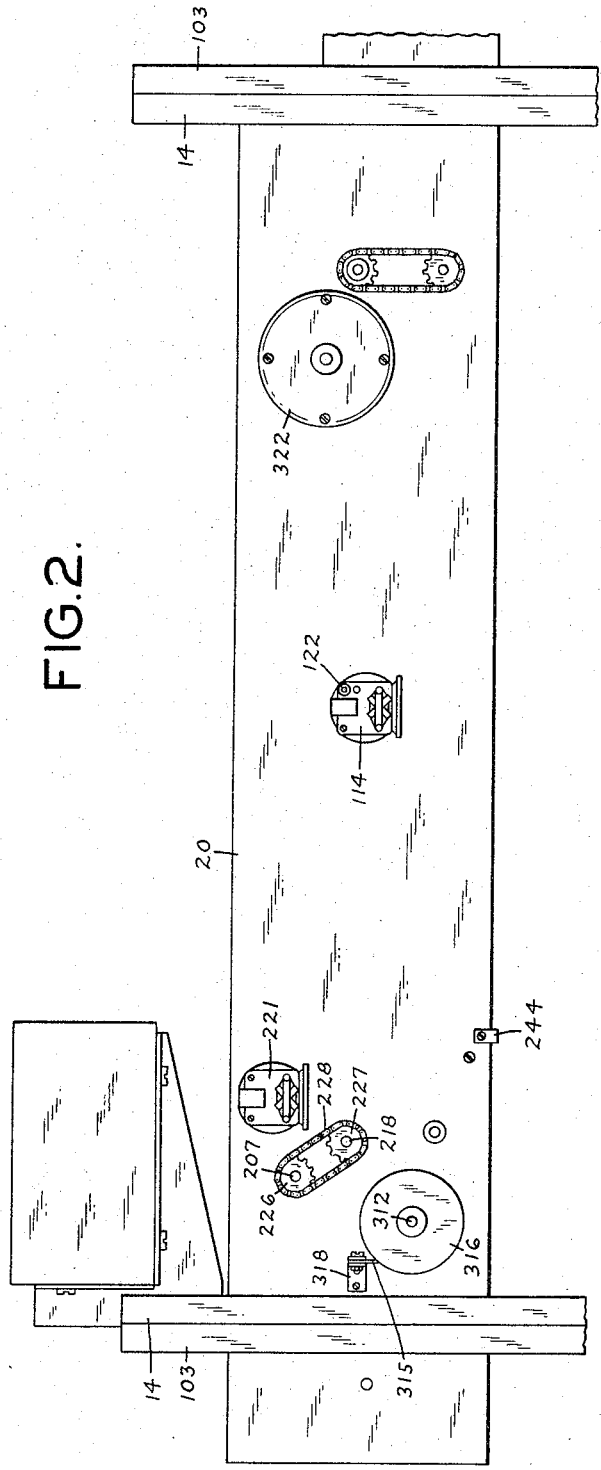
FIG. 2 is a rear elevational view of the apparatus of FIG. 1, with a portion at the left end of the latter omitted.

To keep strings 306 firmly taut the windup cylinder 307 is subjected to a rotational torque by two springs 315 (see FIGS. 2 and 4). Windup cylinder shaft 312 extends through plate 20 and carries two pulley drums 316 thereon. One end of each torsion spring 315 is connected to a different pulley drum 316 both of which are fixedly secured on the end of shaft 312, outwardly of plate 20, by means of set screws 317. Springs 315 are coiled around drums 316 with their other ends fixedly attached to a suitable bracket 318 secured to the outer surface of rear plate 20.

In operation, the separator bar shaft 301 carrying sleeve 300 is moved to the left as seen in FIG. 5 thereby unwinding strings 306 from windup cylinder 307. The strings 306 are kept under tension by tension springs 313, and form a moving supporting base for each work piece as it is separated from the stack by the advancing separator bar sleeve 300. The movement of these strings as they are unwound from cylinder 307 occurs in the direction of advance of sleeve 300 but faster than the movement of the sleeve itself.

Separator bar brackets 302 carry the separator bar sleeve 300 along guide rails 303 by means of a pair of drag chains 319. One drag chain 319 is mounted between guide rail 303 and front plate 18 on two chain sprockets 321 which are rotatably mounted on the inner surface of front plate 18. The other drag chain 319 is similarly mounted between guide rail 303 and rear plate 20 by similar sprockets rotatably mounted on the inner surface of rear plate 20. Each separator bar bracket 302 is connected to the drag chain 319 adjacent it by a hinge pin 320, one end of which is fixedly connected to the chain. The other end of pin 320 is affixed to an upper portion of each bracket 302.

Referring now to FIGS. 1 and 6 it will be seen that adjacent but spaced from the inner face of front plate 18 there is a mounting bar 427 fixedly attached at its ends to front plate 18 by means of brackets 428. Mounting bar 427 lies above both guide rail 303 and drag chain 319. Three switches are adjustably suspended from mounting bar 427 by means of a bracket 429. Bracket 429 is slidably mounted on bar 427 and may be set in any desired position along the bar by means of a screw 430. Mounted on bracket 429 beneath bar 427 are three one-way actuable switches 431, 432 and 433. These switches are spaced apart one from another along the length of the bracket different distances calculated in accordance with the operational timing needs of the apparatus. The switch nearest the left hand end of bracket 429 as seen in FIG. 6 is switch 431 a normally open micro-switch which is connected in parallel circuit with cam operated ruffler switch 245 (see FIG. 8). The middle switch on bracket 429 is a single pole two position switch 432 connected in a circuit to be described hereinafter with the transfer mechanism. The third switch at the right hand end of bracket 429 is a normally open micro-switch 433 which is connected in circuit with the means for moving the drag chains 319. Each of these switches has an actuating arm hanging down into the path of travel of a trigger plate 460 mounted on top of the separator bar bracket 302 lying adjacent front plate 18.

In addition to switches 431–33 there are two more switches in the path of travel of trigger plate 460. Both are mounted on front plate 18. The first is a normally open one-way actuable switch 434 connected in parallel circuit with switches 245 and 431 to control the operation of ruffler motor 221. This switch is facing in the opposite direction to switches 431–33, as shown in FIG. 6, and will be closed by trigger plate 460 as it returns from the right hand end of guide rail 303 to its original position as shown in that figure. Switch 434 is preferably mounted adjacent the left hand bracket 428.

The second switch is a normally closed one-way actuable switch 435 mounted just above trigger plate 460 before it has begun to move to the right in the first half of its path of travel. Switch 435 controls the de-energization of reversing solenoid 338 and in that way controls the direction of movement of separator bar sleeve 300. Switch 435 will be kept open by the trigger plate until it moves out from underneath the switch as it begins a new cycle.

The drag chains 319 for moving separator bar sleeve 300 and trigger plate 460 are powered by an electric motor 322 which is mounted on the outer face of rear plate 20 (see FIG. 1). Between motor 322 and drag chains 319 there is a driving train including a gear mechanism, a safety clutch which insures against breakage when the apparatus is subjected to an unforeseen overload such as a jam up, etc., and a chain sprocket drive mechanism. The gear mechanism moves the upper runs of drag chains 319 to the left or to the right according to the position of trigger plate 460 and the condition of reversing solenoid 338 to be hereinafter described.

Motor 322 is connected to the gear mechanism by gear shaft 323 and driving gear 324 mounted on the end of shaft 323 adjacent the inner face of rear plate 20. The gear mechanism includes a gear support bracket 325 and is designed to drive the safety clutch in a forward or reverse direction in accordance with the condition of the gear mechanism. Bracket 325 is pivotally mounted adjacent driving gear 324 on a drive shaft 326 which is rotatably journaled between front and rear plates 18, 20. Gear support bracket 325 has a lower arm 327 carrying a single gear 332, andg an upper arm 329 carrying a set of two permanently intermeshed gears 330, 331. Gear 332 drives a driven gear 328 in a forward direction when engaged with driving gear 324. Intermeshed gears 330 and 331 drive gear 328 in a reverse direction, however, when gear 331 is engaged with driving gear 324.

Driven gear 328 is rotatably mounted around drive shaft 326 and permanently engaged with both single gear 332 and intermeshed gear 330. Only one of gears 331 and 332, however, is connected to driving gear 324 at any one time.

Gear 332 is engaged with driving gear 324 whenever support bracket 325 is pivoted counterclockwise about shaft 326, and gear 331 is engaged with driving gear 324 whenever the support bracket is pivoted clockwise about the shaft. The means for pivoting bracket 325 counterclockwise about shaft 326 include a pin 333 mounted on and extending inwardly from upper arm 329 of support bracket 325. One end of a tension spring 334 is connected to pin 333 while the other end is affixed to rear plate 20 by a screw 336. Spring 334 is maintained under tension so as to urge bracket 325 counterclockwise about shaft 326 causing gear 332 to engage with drive gear 324.

The means for pivoting bracket 325 clockwise about shaft 326 include the reversing solenoid 338 mounted on a support bracket 339 connected to the inner face of plate 20 by screws 340. Solenoid 338 has an armature 337, the left hand end of which, as seen in FIG. 5, is connected to one end of a second tension spring 335. The other end of spring 335 is connected to pin 333. Support bracket 339 has an upstanding finger 362 at its left hand edge as seen in FIG. 5 to prevent armature 337 from being pulled all the way out of solenoid 338.

In FIG. 5 solenoid 338 is shown de-energized, allowing the tension force in spring 334 to pivot gear support bracket 325 counterclockwise. When solenoid 338 is energized, however, armature 337 moves to the right until the tension in spring 335 overcomes that in spring 334 thereby pivoting the support bracket clockwise disengaging gear 332 and engaging gear 331 with driving gear 324, thereby delivering power to gear 328 and the safety clutch in the reverse direction.

Chains 319 are moved in the forward direction or in reverse according to the rotational direction of gear 328 and the safety clutch which is connected to it. The clutch mechanism includes two discs 342, 343 loosely mounted on shaft 326, a friction layer 344 between said discs, but fixedly mounted on disc 342, a hub 345 connected to disc 342 and a hub 346 connected to disc 343. Hub 345 is rigidly connected to gear 328 and transfers power directly to disc 342 and friction layer 344. Hub 346 has a notch 347 in it. In addition, surrounding shaft 326 adjacent hub 346 is a first collar 348, which is secured to drive shaft 326 by a screw 351. Collar 348 has a finger 352 which fits into notch 347, but not to its full depth. A second collar 349 also surrounding shaft 326 carries an abutment flange 350 on it and may be spaced a distance from first collar 348 and is secured to shaft 326 by a screw 353. A compression spring 354 urges disc 343 against friction layer 344. It is kept under compression by abutment flange 350 which supports one end of it. In case of an overload condition, however, the compression force of spring 354 will yield and allow disc 343 to slip with respect to friction layer 344.

Shaft 326 extends through front and rear plates 18, 20 and powers the chain sprocket mechanism from which the drag chains 319 are driven (see FIG. 3). This mechanism includes a sprocket wheel 356 mounted on each end of shaft 326, two sprocket wheels 341, and two endless chains 355, each of which is trained around one sprocket wheel 356 and one sprocket wheel 341. Sprocket wheels 341 are connected to sprocket wheels 321, around which drag chains 319 are trained, by sprocket shafts 357 which are rotatably journaled through front and rear plates 18, 20. Sprocket wheels 341 are carried on the outer ends of shafts 357 and sprocket wheels 321 are carried on the inner ends.

This completes the description of the driving train for bringing power to drag chains 319 and for moving them in a forward and reverse direction according to the position in which bracket 325 is pivoted about shaft 326.

The direction in which drag chains 319 will be moved when motor 322 is actuated is controlled by the condition of the reversing solenoid 338 hereinbefore mentioned. This solenoid is controlled according to the condition of switches 433 and 435 in connection with circuitry which will be described hereinafter in FIG. 8.

*Transfer mechanism*

The transfer mechanism (see FIGS. 1, 3, 5 and 6) for pulling the separated garment sections off the string grill onto the conveyor mechanism includes a broad endless belt 400 trained around a drive sleeve 401, and an idler sleeve 402. Both sleeves are bearingly mounted around their respective support shafts 403 and 404 which are fixedly mounted at their ends in transfer brackets 405 and 406. Transfer brackets 405, 406 are pivotedly mounted on a shaft 407 which is positioned between sleeves 401 and 402. This shaft extends through transfer brackets 405, 406, and is supported at its ends by support brackets 408, 409. Brackets 408, 409 have mounting portions 410 supporting them slidably along guide rails 303.

Transfer bracket 405 is closer to front plate 18 than bracket 406 and has an arm 411 extending upwardly from shaft 407. The purpose of arm 411 is to rock the transfer mechanism into one of two different positions according to the condition of a transfer solenoid 412 to which arm 411 is connected by a tension spring 413 (see FIGS. 6 and 1). Between the end of arm 411 and the point at which tension spring 413 is connected to it there is a second tension spring 414 for rocking the transfer mechanism counterclockwise (as seen in FIG. 6) whenever solenoid 412 is de-energized. One end of tension spring 414 is connected to arm 411 and the other end is connected to support bracket 408 by a screw 415 in order to maintain the spring under tension. When rocked into its counterclockwise position (see FIG. 6 again) sleeves 401 and 402 together with belt 400 are rocked into a horizontal position so that belt 400 contacts the leading edge of a separated work piece lying on the string grill beneath it. When rocked into a clockwise position belt 400 contacts the conveyor mechanism at the lowest point on the belt and clamps the leading edge of the work piece between the conveyor mechanism and belt 400 (see FIG. 15) pulling the work piece off the string grill and onto the conveyor mechanism for transport to a receiving station (not shown) at the delivery end of the apparatus. FIG. 15 shows the transfer mechanism in two positions but the view looks from the front of the apparatus as seen in FIG. 1 instead of the rear as in FIG. 6. The surface speed of belt 400 is adjusted to match the speed of the conveyor belts forming part of the conveyor mechanism so that any work piece clamped and travelling between the transfer mechanism and the conveyor will not be frictionally disarranged.

Driving sleeve 401 has a driving sprocket 416 at the end adjacent bracket 405 and is driven from a conveyor transfer motor 417 by means of an endless chain mechanism to be hereinafter described in connection with the conveyor.

Figure 7:
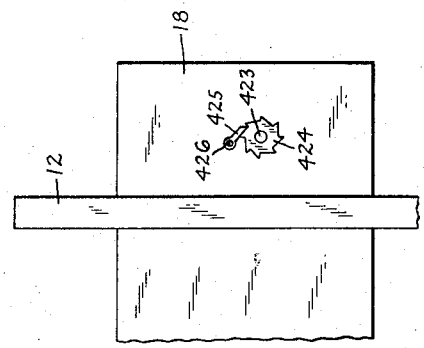
FIG. 7 is a fragmentary view of the front of the apparatus of FIG. 1 showing a pawl and ratchet arrangement for locating the transfer mechanism with respect to the ruffler mechanims.

Support brackets 408 and 409 are slidably mounted on separator bar guide rails 303 as mentioned above. Thus they may be moved toward the ruffler mechanism or away from it according to the dimensions of the work pieces in the stack to be separated. Brackets 408, 409 and 410 are held in a fixed position on guide rails 303 by the conveyor mechanism which pulls the brackets away from the ruffler, and by a pair of tension wires 418 which urge the brackets toward the ruffler. One end of tension wires 418 is mounted on horizontal arms 419, 420 of support brackets 408, 409 by means of screws 421 (see FIGS. 3 and 5). The other ends of tension wires 418 are affixed to two windup pulleys 422, 422a mounted on a shaft 423 which is rotatably journaled through front and rear plates 18, 20. As seen in FIG. 7 shaft 423 extends through plate 18 carrying ratchet wheel 424 on its end. Ratchet wheel 424 is fixedly mounted on the end of shaft 423 adjacent plate 18, and adjacent ratchet wheel 424 is a pawl 425 pivotally mounted on a pin 426. Pawl 425 is adapted to engage ratchet wheel 424 to prevent shaft 423 from rotating in the direction which would unwind wires 418 and allow the conveyor and transfer mechanisms together with brackets 408, 409 and 410 to move further away from the ruffler mechanism.

*Conveyor mechanism*

The conveyor mechanism serves to carry the work pieces from the transfer mechanism to the delivery end of the apparatus and includes a plurality of moving endless belts 501. It is a characteristic feature of the conveyor mechanism that the length of the upper run of these belts is adjustable to enable the apparatus to separate single plies from stacks of work pieces having different dimensions. The length of the upper runs of belts 501, as seen in FIG. 5, is a function of the position of support brackets 408, 409 and 410 on guide rails 303. Belts 501 are trained around rollers at five different points along their path of travel and are supported at a sixth point adjacent the transfer mechanism as will now be described.

The first point around which belts 501 are trained lies adjacent and below the transfer mechanism. It comprises a plurality of rollers 530 fixedly mounted on a sleeve 503 which rotates on needle bearings (not shown) on a shaft 500 mounted between support brackets 408 and 409. Adjacent rollers 530 and adjacent the upper runs of belts 501 is a support sleeve 504 which also rotates on needle bearings, but on a support shaft 505 which is also fixedly mounted between support brackets 408 and 409. The function of support sleeve 504 is to support belts 501 against the pressure of the transfer mechanism when in the normal, i.e., tilted or clockwise position as seen in FIG. 6. This enables a work piece to be gripped between broad belt 400 and conveyor belts 501 as it is pulled off the string grill onto the conveyor.

At the other end of the upper runs of belts 501, the belts are trained around a plurality of rollers 506. These rollers are fixedly mounted on a shaft 507 which is rotatably journaled between front and rear plates 18, 20. Fixed on shaft 507 adjacent the inner face of plate 20 is a driven pulley 508 which is connected to the conveyor transfer motor 417 by means of a driving pulley 509 mounted on the motor shaft (not shown), and a driving belt 510 which is trained around pulleys 508 and 509. Near the middle of the lower runs of belts 501 there is a tension device 511 which maintains the belts taut. Tension device 511 is adapted to provide extra length to the upper runs of the belts if the conveyor surface is to be lengthened, and to take up unneeded belt lengths if the conveyor surface is to be shortened. It includes the remaining three points around which belts 501 are trained.

Belts 501 are provided with sufficient length to accommodate the longest stack of work pieces which the apparatus can possibly handle. Normally, of course, work pieces come in lengths less than this maximum so that under ordinary conditions belts 501 are longer than necessary. This surplus length is accommodated by the tension device 511 which forms a separate downwardly extending loop in the lower run of each belt. To do this belts 501 are trained around rollers 512 fixedly mounted on a shaft 513 and rotatably journaled between plates 18 and 20, the first downwardly extending run of this loop beginning at those rollers. At the bottom of each loop each run is trained around a roller 514 which is connected to a weight 515 by a hanger bar 516. Weights 515 pull downwardly on the loops to provide the necessary tension in them. From rollers 514, belts 501 extend upwardly to the fifth and final point around which they are trained. This point includes a plurality of rollers 517 fixedly mounted on a shaft 518 which like shaft 513 is rotatably journaled between front and rear plates 18, 20.

To keep the loops in belts 501 from interfering with each other hanger bars 516 extend downwardly through guide holes 519 in a spacer bar 520. Spacer bar 520 rests on top of weights 515 and moves vertically up and down with these weights according to the length of the upper runs of belts 501 and the position of brackets 408, 409 and 410 on guide rails 303. To prevent weights 515 and the loops in belts 501 from hanging any way but vertically, spacer bar 520 is mounted at its opposite ends over and in a vertically slidable relation with standards 521 by means of openings 520a. Standards 521 are vertically mounted on bottom plate 16 in a plane which maintains each loop in belts 501 substantially directly beneath its rollers 512 and 517. Regardless of whether the upper runs of the conveyor belts are long or short or whether the apparatus is running or not, standards 521 will maintain the loops in essentially this relationship.

Referring now to FIGS. 1 and 3a the chain drive for supplying power to the transfer mechanism will be explained. As mentioned hereinbefore shaft 507 drives belts by means of rollers 506. The other rollers around which belts 501 are trained are idler rollers which rotate solely because of the frictional engagement between themselves and belts 501. The frictional engagement between belts 501 and rollers 517 is sufficient to rotate shaft 518 with adequate power for driving transfer drive sleeve 401. To provide better frictional engagement rollers 517 are preferably knurled. Any of the other rollers also may be knurled if desired. Mounted on shaft 513 is a freely rotatable chain pulley 523, and mounted on shaft 518 is a driving sprocket 524 which is in line with pulley 523 along the length of the apparatus and a second freely rotatable chain pulley 525 (see FIG. 1). An endless chain 526 is trained around transfer mechanism driving sprocket 416 and the lower run of this chain engages driving sprocket 524 underneath shaft 518. Chain 526 then engages chain pulley 523 above drive shaft 513, and from there extends downwardly in a loop similar to the loops in belts 501. At the bottom of the loop there is a freely rotatable chain pulley 527 (see FIG. 3a). Suspended from pulley 527 is a hanger bar 528 from which is suspended a weight 529 in a manner similar to those used with belts 501. Hanger bar 528 extends through an opening 522 in spacer bar 520. From chain pulley 527 endless chain 526 extends vertically upwards passing over chain pulley 525 on shaft 518 and on back to transfer mechanism driving sprocket 416. Rotation of shaft 518 by belts 501 will rotate the transfer drive sleeve 401 and cause broad belt 400 to move around sleeves 401 and 402 whenever conveyor transfer motor 417 is energized. Counterclockwise rotation of motor 417 will urge the upper runs of belts 501 to the left as seen in FIG. 1, and will rotate shaft 518 clockwise. This in turn draws the lower run of endless chain 526 to the left as seen in FIG. 1 rotating the upper run of belt 400 to the right as shown by the arrow in that figure.

Looking at chain 526 from the rear as seen in FIG. 3a, shaft 518 is rotating counterclockwise, and the upper and lower runs of the chains are moving to the left and right respectively. The direction in which shaft 513 is rotating is unimportant because chain pulley 523 is freely rotatable over it.

Referring again to FIGS. 1, 5 and 7 it should now be clear that brackets 408 and 409 are held in a single position on guide rails 303 according to the tension in belts 501 and the length of tension wires 418 between brackets 408, 409 and windup pulleys 422, 422a. Belts 501 and chain 526 pull brackets 408, 409 to the left, as seen in FIG. 1, while tension wires 418 hold them where they are. To lengthen the conveyor mechanism and adjust the apparatus to handle shorter work pieces, shaft 423 (see FIG. 7) should be rotated clockwise. This will pull the transfer mechanism to the right along guide rails 303 as seen in FIG. 1. It will also pull conveyor rollers 530 to the right thereby reducing the size of the loops and lifting weights 515 and 529. The opposite may be done when it is desired to shorten the conveyor to set the apparatus to handle longer work pieces.

It will be realized that the location of switch bracket 429 on mounting bar 427 depends on the location of support brackets 408, 409 and 410 on guide rails 303. These brackets determine the position of the transfer mechanism and the end of the conveyor with respect to the work piece stack. Once they have been set for a stack of garment sections of known length, switch bracket 429 must be brought into position on mounting bar 427 to ensure that each of switches 431–33 will be tripped at the proper time.

*Electrical circuitry*

The control circuits which determine the sequence of operation of the various mechanisms in this apparatus are shown schematically in FIG. 8. They include a ruffler mechanism motor circuit, a conveyor transfer mechanism motor circuit, a self-leveling platform motor circuit, a separator mechanism motor circuit, and some additional circuits involving relays. One of these additional circuits controls the operation of the reversing solenoid 338. Another controls the operation of the transfer mechanism solenoid 412. This latter circuit also partially controls the separator motor as will become clear from the detailed description of the circuitry.

Power is supplied to the circuits from a main hot terminal 600 and a main ground terminal 601. In series with hot terminal 600 is a two position main switch 602 for controlling the energization of the rest of the circuitry. Between switch 602 and ground terminal 601 there is a control light 603 which will light up to indicate when the main switch 602 has been closed and the power is turned on. All the remaining ground terminals in the apparatus are connected in parallel with main ground terminal 601, and all the remaining hot terminals are connected directly to the junction between control light 603 and one side of main switch 602 so that they will become energized as soon as main switch 602 is closed.

Whenever main switch 602 is closed the platform elevator motor will operate provided switch 123 is also closed. The electrical circuit which performs this job is indicated in the lower left hand part of FIG. 8. It includes a hot terminal 604 and a ground terminal 605 which latter terminal is connected in series with one side of platform motor 114. The other side motor 114 is connected with hot terminal 604 by means of two series circuits connected at their ends in parallel with each other. One of these circuits includes a normally open reset button 606 connected between motor 114 and hot terminal 604. The other circuit beginning at motor 114 includes normally open switch 123 and a hand operated emergency toggle switch 607.

Referring now more particularly to the ruffler mechanism control circuitry in the upper left hand part of FIG. 8, it will be seen that one end of ruffler motor 221 is connected to a ground terminal 608. The other end of motor 221 is connected to a hot terminal 609 by means of two circuits connected in parallel with each other. One of these circuits includes a reset button 610 which is series connected between hot terminal 609 and motor 221. The other circuit includes beginning at hot terminal 609, an emergency toggle switch 611 in series with a parallel circuit comprising cam operated ruffler switch 245 in parallel with normally open switch 431 which is in turn in parallel with normally open switch 434. All three of these parallel connected switches are connected to motor 221 at their ends opposite emergency toggle switch 611.

Movement of separator bar sleeve 300 begins by starting separator motor 322. One end of this motor is connected to a ground terminal 612. The other end of motor 322 is connected to the hot terminal 613 through two series circuits in parallel with each other, one of which includes a normally open reset button 614 which is series connected between motor 322 and hot terminal 613. The other circuit beginning at hot terminal 613 includes an emergency toggle switch 615 in series with normally open cam operated separator control switch 248 which in turn is series connected with a switch arm 616 in a relay A. Relay A may be a spring return relay and includes four contacts 617, 618, 619 and 620, and two switch arms 616 and 621 as will be explained more fully hereinafter.

Switch 432 is a single pole two position switch actuated by trigger plate 460 on separator bar bracket 302 and is shown in the lower righthand portion of FIG. 8 in its normal position i.e. not contacted by the trigger plate. In this position switch 432 completes a series capacitor charging circuit beginning at a hot terminal 622 and including in order from there an emergency toggle switch 623, a resistor 624, and a rectifier 625, capacitor 626, switch arm 627, switch contact 628 and a ground terminal 629. When trigger plate 460 contacts and operates switch 432 it moves arm 627 disconnecting it from contact 628 and connecting it with switch contact 630, thereby opening the capacitor charging circuit just mentioned.

At the same time it completes a capacitor discharging circuit which includes a relay coil 631, belonging to relay A. One end of relay coil 631 is connected to capacitor 626 and the other end is connected to switch contact 630. Connected in parallel with relay coil 631 is a series circuit including a fixed resistance 632 and a variable resistance 633. Capacitor 626 and relay coil 631 comprise a timing circuit which keeps coil 631 energized until the charge on capacitor 626 has been reduced to a predetermined level. Variable resistor 633 is used to vary the time it takes the capacitor to discharge to that level.

This actuation of switch 432 by trigger plate 460 completes the capacitor discharging circuit energizing coil 631 and actuating relay A.

Before discussing the effects of the actuation of relay A on the circuitry of the apparatus it is advisable to describe some additional circuits and circuit elements in order to better comprehend their operation in connection with the relay. Thus, there is an additional capacitor charging circuit extending from a hot terminal 634 to a ground terminal 635 by means of a series circuit which includes starting at hot terminal 634 a resistor 636, a rectifier 637, a capacitor 638, switch arm 621, contact 617 and ground terminal 635.

Contact 618 is series connected to one end of a relay coil 639 the other end of which is connected to the above mentioned series circuit at a point between rectifier 637 and capacitor 638. Relay coil 639 is part of a relay B which has two contacts 640, 641 and one switch arm 642. As with relay A, relay B is a spring return relay. Contact 641 is a blind contact, and contact 640 is series connected to a hot terminal 643. Switch arm 642 is series connected to one end of transfer solenoid 412, the other end of which is connected to a ground terminal 644.

Relay A is normally in a de-energized condition when switch 432 is actuated by the advancing trigger plate 460. Actuation of relay A has two effects. First it opens the circuit to separator motor 322, and second it opens the circuit for charging capacitor 638 and simultaneously closes the circuit for discharging that capacitor. The first effect is accomplished by disconnecting switch arm 616 from contact 619 and connecting it with blind contact 620. The second effect is accomplished by disconnecting switch arm 621 from contact 617 and connecting it with contact 618. This latter connection shorts capacitor 638 across coil 639 causing the coil to become briefly energized. Energization of this coil actuates relay B and opens the circuit to transfer solenoid 412 thereby de-energizing the solenoid allowing the transfer mechanism to be rocked counterclockwise by spring 414 as seen in FIG. 6. This is accomplished by moving switch arm 642 from contact 640 to contact 641.

Further forward travel of trigger plate 460 causes the plate to contact switch 433 closing same and energizing a delay circuit for operating a third relay, namely, relay C at the end of the delay period. Like relays A and B relay C may be a spring return relay. It includes four contacts 645, 646, 647, 648 and two switch arms 649, 650. Contact 645 is a blind contact, and switch arm 649 is connected with a hot terminal 651. Contact 646 is connected to one end of reversing solenoid 338, the other end of which is connected to a ground terminal 652. Contact 647 is a blind contact but contact 648 is connected to a ground terminal 653 by means of a series circuit beginning at the contact and including a rectifier 654 in series with a resistor 655. The polarity of the rectifier permits the flow of positive charge from ground terminal 653 toward contact 648 but has a high impedance to the flow of positive charge in the opposite direction.

Switch arm 650 is permanently connected to contact 648 through switch 433. Switch arm 650 is also connected to a hot terminal 656 through a series circuit including a capacitor 657 in parallel with a relay coil 658, one side of which is connected to the switch arm, and a normally closed switch 435 the other end of which is connected directly to hot terminal 656.

When trigger plate 460 closes normally open switch 433 current begins to flow into capacitor 657. After this capacitor has built up a sufficient charge enough current will flow through relay coil 658 to energize and actuate relay C. Actuation of this relay has two effects. First, it sets up a holding circuit to maintain the relay actuated regardless of the later open or closed condition of switch 433. This is accomplished by moving switch arm 650 from blind contact 647 into connection with contact 648 thereby permitting the current flow to by-pass switch 433. Second, it energizes reversing solenoid 338 thereby setting the apparatus into condition for returning the separator bar sleeve 300 to its original position. This is accomplished by moving switch arm 649 from contact 645 into connection with contact 646.

Relay C will remain actuated keeping the gear train in "reverse" until separator bar sleeve 300 returns to its original position and trigger plate 460 contacts and opens switch 435.

Conveyor transfer motor 417 is connected in a series circuit between a hot terminal 660 and a ground terminal 661, but is separated from the hot terminal 660 by a hand operable emergency switch 662. Switch 662 enables the conveyor transfer motor 417 to be shut off even though the main switch 602 is closed and the remainder of apparatus is energized.

*Machine operation*

The operation of the apparatus will now be described in two separate parts. The first of these will cover the operation of the apparatus assuming that stack platform elevator 100 is at its proper level. The second will cover the operation of the stack platform elevator itself in conjunction with the remaining parts of the apparatus.

The description of a cycle of operation of the apparatus will begin at the point where the separator bar sleeve 300 and more particularly trigger plate 460 is halfway on its return run toward the righthand end of the apparatus as seen in FIG. 1.

At this point the ply ruffler mechanism lies inactive above the stack of garment sections and ruffling plate 200 is pivoted as far as it will go counterclockwise around fulcrum shaft 204 (see FIG. 15). Ruffler drive shaft 207 is so oriented that cam 246 is at a low dwell point maintaining switch 245 open. Cam 249 is at a high dwell point maintaining switch 248 closed, thereby keeping separator motor 322 energized. In addition transfer solenoid 412 is energized as is the reversing solenoid 338. Under these conditions relay B is de-energized as is relay A, but relay C is energized.

Continued movement of trigger plate 460 to the left as seen in FIG. 6 causes it to actuate normally open switch 434 thereby completing the ruffler motor circuit starting the ruffler mechanism. Trigger plate 460 soon passes switch 434 permitting it to open again, but by this time ruffler drive shaft 207 has rotated cam 246 sufficiently to position it at one of its high dwell points thereby maintaining switch 245 closed to keep ruffler motor 221 operating even though switch 434 becomes opened again.

Thus, the ruffler mechanism is lowered onto a stack of garment sections to begin its ruffling operation. Before it completes its descent, however, ruffler drive shaft 207 has rotated cam 249 to the point where it is in its low dwell position thereby opening switch 248 stopping separator motor 322. Separator bar sleeve 300 and trigger plate 460 continue to travel a short distance, however, in the rearward direction before stopping. Before they actually come to rest, trigger plate 460 opens normally closed switch 435.

This stops the flow of current from hot terminal 656 to relay coil 658, but the presence of capacitor 657 in parallel with relay coil 658 provides a period of delay before the current through the coil becomes sufficiently small to de-energize relay C. Since relay C is of the spring return type when the current reaches this low point, the relay is spring returned to its former position thereby de-energizing reversing solenoid 338. The delay period provided by capacitor 657 is needed to enable separator bar sleeve 300 and trigger plate 460 to stop their rearward movement completely before the reversing solenoid is de-energized.

De-energization of reversing solenoid 338 as hereinbefore explained permits tension spring 334 to rock the gear train counterclockwise as seen in FIG. 5 thereby connecting it for forward drive operation the next time the separator motor 322 is energized.

The ruffler mechanism continues to operate during this period until a portion of the top layer in the stack is ruffled into a loop which is clamped between the ruffling plate 200 and clamping plate 209 is lifted above the stack. As the ruffling mechanism reaches a predetermined point above the stack, ruffler drive shaft 207 rotates cam 246 so as to open switch 245 thereby turning off the ruffler motor. At the same time, cam 248 reaches its high dwell point and closes switch 249 thereby energizing separator motor 322.

This starts separator bar sleeve 300 and trigger plate 460 moving in a forward direction. After advancing a distance forward trigger plate 460 closes normally opened switch 431 which re-energizes ruffler motor 221 allowing the ruffler mechanism to release the clamped work piece loop. Switch 431 opens again when trigger plate 460 passes, but by this time ruffler drive shaft 207 has rotated cam 246 to a high dwell point maintaining switch 245 closed for a short period of time thereby keeping the ruffler in operation until it has completely released the work piece loop. Further rotation of ruffler drive shaft 207 moves cam 246 to a low dwell point at which time switch 245 is permitted to open again thereby shutting off the ruffler after the work piece has been released.

Trigger plate 460 still moving in a forward direction then actuates switch 432 shorting charged capacitor 626 across relay coil 631 which energizes and actuates relay A. As mentioned hereinbefore, this indirectly de-energizes transfer solenoid 412 causing it to rock clockwise as seen in FIGS. 1 and 5 and counterclockwise as seen in FIG. 6. Still further forward travel of trigger plate 460 causes it to close normally open switch 433, which, operating through the delay circuit, spoken of hereinbefore, after a delay period actuates relay C and thereby energizes reversing solenoid 338. This rocks gear support bracket 325 clockwise about drive shaft 326 thereby setting the gear mechanism to move separator bar sleeve 300 and trigger plate 460 in the reverse direction the next time separator motor 322 is energized.

It should be realized that actuation of switch 432 not only causes transfer solenoid 412 to be de-energized, it also opens the circuit to separator motor 322. Thus, by the time switch 433 is actuated and reversing solenoid 338 is actuated (after the aforementioned delay period) motor 322, separator bar sleeve 300 and trigger plate 460 will have come to a complete stop. It should also be realized cam 249 on ruffler drive shaft 207 remains at a high dwell position so that switch 248 is closed to insure that separator motor 322 will be started again whenever relay A becomes de-energized and spring returned to its former position.

Before relay A becomes de-energized, however, relay B will become de-energized and spring returned to its former position in which transfer solenoid 412 is again connected to hot terminal 643, and is energized thereby rocking the transfer mechanism counterclockwise as seen in FIG. 5 and clockwise as seen in FIG. 6. After this has happened relay A will become de-energized because capacitor 626 will have reached its predetermined low level of charge to cause this to happen. Thus, switch arm 616 moves from blind contact 620 to contact 619 starting separator motor 322. In addition switch arm 621 is moved from contact 618 to contact 617 thereby opening the capacitor discharge circuit and closing the charging circuit for capacitor 633. As trigger plate 460 begins its rearward travel switch 433 is permitted to open, but with no effect due to the holding circuit spoken of hereinbefore in connection with relay C.

Additional travel in the rearward direction moves trigger plate 460 out from under switch 432 permitting it to return to its former position thereby moving switch arm 627 from contact 630 to contact 628 completing the charging circuit to capacitor 626. This sets up the circuitry of relay A for a new cycle of operation the next time trigger plate 460 connects switch 432. Passage of trigger plate 460 underneath switch 431 has no effect on the switch because it is in the reverse direction. Thus switch 431 stays in its normally open configuration.

One complete cycle of operation has now been described and another one will begin as soon as trigger plate 460 strikes and operates switch 435 as discussed above.

As mentioned hereinbefore in connection with the description of the operation of the platform elevator 100, there are two additional ways in which the elevator can be raised, one of these involves opening emergency toggle switches 611 and 615 and thereafter closing normally open reset button 606 providing power to elevator motor 114. The motor will continue to run and platform 100 will continue to rise until reset button 606 is released. At that point the emergency togggle switches 611 and 615 must be returned to their normally closed condition.

There is still a third and better way, however, to speedily raise platform 100 and simultaneously achieving a fine adjustment with respect to the proper level which is not achieved with the method just mentioned. This third method involves actuating the ruffler motor 221 until the swing arms have descended to the point where pin 220 engages switch arm 124 actuating switch 123. This is done by opening emergency toggle switches 611 and 615 as before and then operating reset button 610 to start ruffler motor 221 and keep it running until the swing arms have reached their low dwell point. Power is then automatically supplied to elevator motor 114 since switch 123 has been closed. Motor 114 will continue to run until switch 123 is opened because ruffler motor 221 and separator motor 322 have been rendered inoperative by means of their emergency toggle switches 611 and 615. When platform 100 reaches its proper level and stops, emergency toggle switches 611 and 615 should be returned again to their normally closed position, thus setting the circuitry in condition for normal operation once more.

Referring now to FIGS. 9, 9a, 10 and 10a the second embodiment of the apparatus will be explained in connection with the ruffler mechanism. This second embodiment as previously mentioned is designed to separate folded work piece plies from a stack. The first embodiment is designed to separate only flat or unfolded work pieces. In FIG. 9 the right-hand edge of the stack comprises a plurality of folded work piece edges. The ruffler mechanism in this second embodiment operates almost identically to that shown in FIG. 5, except that it is located at the left hand edge of the stack with the clamping plate opening to the left. The first embodiment has the ruffler at the right hand edge of the stack with the clamping plate opening to the right.

In addition to having the ruffler mechanism at the left hand edge in the second embodiment two other elements are preferably added to enable the apparatus to properly handle folded work pieces. One of these is a second stiffening plate 251 which is mounted on a shaft 252 similarly to the stiffening plate 239a at the right hand edge of the stack as shown in FIG. 9. The same element is shown in FIG. 5 illustrating the first embodiment of the invention by the reference character 239.

It should be noted that the small letter *a* used after a reference character in the second embodiment of the invention designates an element which exists in the first embodiment of the invention with the same reference character but without the letter postscript.

Thus, shaft 252 is rotatably journaled between front and rear plates 18a, 20a and is biasing plate 251 downwardly on the stack by a tension spring 253 onto the top of the stack so as to constrain the next lower work piece ply against following the movement of the top ply as it is ruffled into a loop by the ruffler mechanism. One end of tension spring 253 is connected to a bracket 254 which is fixedly mounted on the inner side of rear plate 20a. The other end of tension spring 253 is connected to a crank arm 255 which is fixedly mounted on the end of shaft 252 which protrudes through rear plate 20a. Crank arm 255 has a threaded portion 256 into which a screw 257 is threaded from below. Between the head of screw 257 and crank arm threaded portion 256 there is a nut 258 threaded onto the screw. Between nut 258 and the head of screw 257 is the loop end 259 of a multi-angular rod 260 which extends from side loop portion 259 laterally and transversely underneath rear plate 20a, and then upwardly through two guide brackets 261, 262 which are fastened to the inner face of plate 20a then again laterally and transversely away from plate 20a toward plate 18a for a distance and then downwardly for a short distance, as seen in FIGS. 9 and 10a. At the end of this downwardly extended portion of rod 260 is a flattened head 263 which engages a pin 264 extending from one of swing arms 205a outwardly toward rear plate 20a. Pin 264 is mounted on swing arm 205a between cam follower 219a and fulcrum shaft 204a.

The function of the additional stiffening plate 251 and the mechanism including multi-angular rod 260 connecting it with the movement of swing arm 205a is to raise stiffening plate 251 off the stack slightly to facilitate peeling the lower layer of the folded work piece off the stack. This stiffening plate is lifted off the stack as the ruffler mechanism is raised away from the stack after it has ruffled a portion of the top ply of the work piece into a loop. Separator bar sleeve 300a then travels to the left as shown in FIG. 9, but due to the lifting of stiffening plate 251 no portion of the work piece will be held under the stiffening plate as the work piece is separated, unfolded and placed on top of the string grill. This ensures that the work piece end will not be pulled from between the clamping plate 209a and ruffling plate 200a.

Nut 258 is vertically adjustable on screw 257 and may be rotated clockwise or counterclockwise to move it up or down as desired. Since the looped end 259 of multi-angular rod 260 will start moving upwardly at the same time in each ruffler mechanism cycle, the timing of the lifting of stiffening plate 251 is controlled by the vertical position of nut 258 on screw 257. The higher the dwell the level of nut on the screw, the more time will elapse before stiffening plate 251 is raised off the stack.

The remaining portions of the ruffler mechanism are all similar to those described in connection with the first embodiment of the apparatus. Thus, the ruffler plate 200a has an arcuate underface 201a comprising a high friction surface as in the first embodiment of the invention. Clamp plate 209a is supported by swing arms 205a by means of hinge pins 208a and is biased into contact with the arcuate underface by leaf spring 214a. Ruffler plate 200a is pivoted about shaft 204a by actuating lever 233a and lever bar 238a, while actuating lever 233a is pivoted about fulcrum shaft 234a according to the position of cam follower 232a in groove 231a of cam 229a mounted on ruffler drive shaft 207a. As in the first embodiment ruffler drive shaft 207a is driven from ruffler motor 221a by a pair of pulleys 222a and 224a around which a belt 225a is trained. Pulley 222a is fixedly mounted on ruffler drive shaft 207a and pulley 224a is fixedly mounted on one end of the motor shaft (not shown) of 221a.

Figure 10:
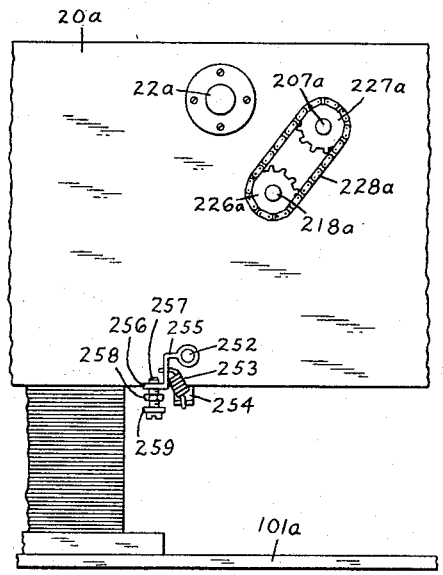
FIG. 10 is a rear view of a portion of the apparatus of FIG. 9, showing the arrangement of the second stiffener plate and release mechanism.
Figure 10A:
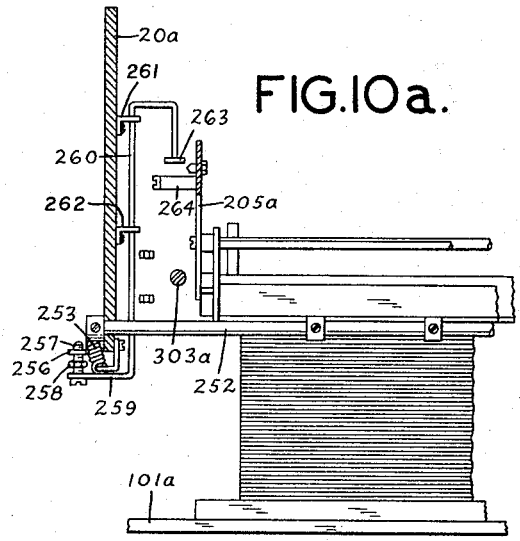
FIG. 10a is a transverse sectional view of a portion of the apparatus of FIG. 9 taken on line 10—10 of that figure.
Figure 11:
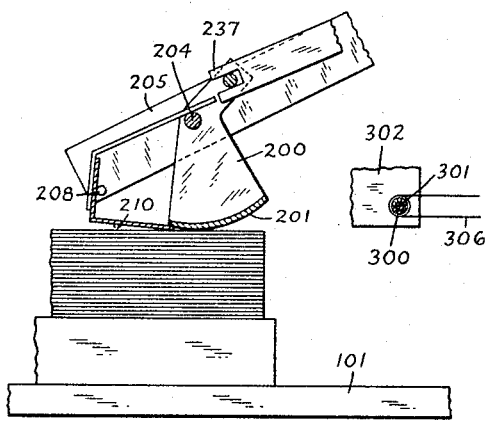
Figure 12:
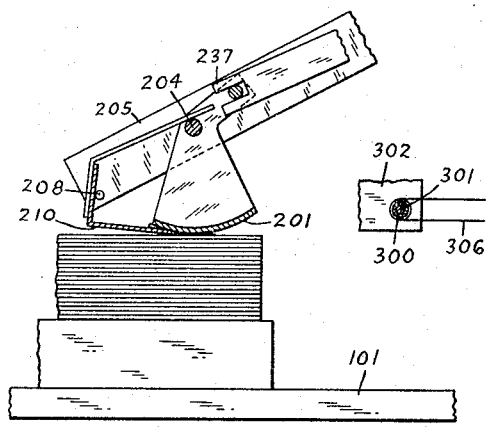

The remainder of the portions of the apparatus seen in FIGS. 9, 9a, 10 and 10a simply complete the disclosure of the relationship of the second embodiment of the ruffler mechanism to the separator mechanism. Thus drag chains 319a are shown trained around sprockets 321a and separator bar brackets 302a are slidably mounted along guide rails 303a and driven by hinge pins 320a so as to carry separator bar sleeve 300a in the appropriate direction at the appropriate speed at the appropriate time. A compression spring 361a is affixed on each guide rail 303a between bracket 302a at the end of their return travel. Strings 306a are trained around separator bar sleeve 300a as with the first embodiment of the invention. In addition as seen in FIGS. 9a and 10 ruffler drive shaft 207a is connected to ruffler lift cam shaft 218a by a chain 228a which is trained around sprocket wheels 227a and 226a mounted on outer ends of shafts 207a and 218a respectively. The relationship of lift cam 217a to cam follower 219a can be seen in FIGS. 9 and 9a.

The apparatus of this invention may be used alone or in combination with both the Work Piece Inverter Conveyor invention disclosed and claimed in a U.S. patent application filed by us on June 4, 1965, and with the Vibrator Conveyor invention disclosed and claimed in a U.S. patent application filed by two of us, namely, John G. Attwood and Robert L. Kosrow on the same day. The apparatus of the present invention may be advantageously used ahead of or in between the Vibrator Conveyor and the Work Piece Inverter Conveyor and is adapted to cooperate with both.

While a preferred form of the invention has been described in considerable detail in order to explain the nature of the invention, it will be understood that various changes in the details, materials and arrangement of parts may be made by those skilled in the art within the principle and scope of the invention as expressed in the appended claims.

What is claimed is:

1. In an apparatus for automatically picking up and separating flat flexible material work pieces individually from a stack of such work pieces, and having means for lifting a portion of the top ply of the uppermost work piece off the stack without disturbing any of the plies beneath said top ply, means for lifting the remainder of said uppermost work piece off said stack and for supporting the separated work piece in a single layer above said stack, said last mentioned means comprising separator bar means, means for moving said bar means over said stack between the remainder of said uppermost work piece and the top of the work piece in the stack immediately beneath said uppermost work piece, and automatically retracting string grill means attached at one end to said separator bar means for supporting the separated work piece above the stack.

2. In an apparatus for automatically separating flat flexible material work pieces individually from a stack of such work pieces and delivering the same to another apparatus, which comprises means for lifting the uppermost work piece from the stack, string grill means for supporting each separated work piece in a single layer above said stack, conveyor means adjacent one end of said string grill means for carrying separated work pieces to a station for further handling, a transfer mechanism positioned between said string grill means and said conveyor means for moving a separated work piece from said string grill means onto said conveyor means, said transfer mechanism comprising short endless belt means adjacent both said string grill means and said conveyor means and trained around at least two parallel but separated rollers, means for driving said belt around said rollers in a desired direction, and means for sequentially rocking said rollers and said belt into two different positions about an axis between said rollers and parallel to each, the construction being such that in one of said positions said belt means frictionally contacts the separated work piece on said string grill means and pulls it part way off said grill means toward said conveyor means, while in the other of said positions it clamps the leading edge of a partially pulled off work piece onto said conveyor means and causes it to be pulled the rest of the way off said string grill means and onto said conveyor means.

3. In apparatus as set forth in claim 2, said means for driving said belt around said rollers in a desired direction comprises a sprocket wheel connected with one of the rollers, a chain drive mechanism having an endless chain trained around said sprocket wheel for rotating the roller with which said wheel is connected, and means including a sprocket for driving said chain, thereby driving said belt.

4. Apparatus for automatically separating flat flexible material work pieces individually from a stack of such work pieces and for conveying separated work pieces to a receiving station for subsequent handling, said apparatus comprising means for frictionally moving a portion of the top ply of the uppermost work piece off the stack without disturbing any of the plies beneath said top ply, a self-leveling stack support platform for maintaining the top of the stack at an operating level with respect to said means for frictionally moving a portion of said top ply off the stack, means for lifting the remainder of said uppermost work piece off said stack and for supporting the separated work piece in a single layer above said stack, conveyor means having an adjustable length conveying surface for moving separated work pieces to a receiving station for subsequent handling and for adapting the apparatus to handle work pieces having different dimensions, a transfer mechanism positioned between said means for lifting the remainder of said uppermost work piece off said stack and said conveyor means, for moving a separated work piece from said means for supporting the separated work piece above said stack onto said conveyor means.

5. Apparatus according to claim 4 in which said means for moving a portion of the top ply of the uppermost work piece off the stack without disturbing any of the plies beneath said top ply comprises, a clamping element having upper and lower surfaces which merge into a free edge joining said two surfaces, a pivotally mounted ply ruffler comprising an arcuate high friction surface element, one portion of which contacts the upper surface of said clamping element adjacent its edge, means for lowering and raising said clamping element and ply ruffler together onto and off of the top of said stack so that when in contact with the top of said stack said clamping element rests on said top ply constraining it from sliding under said element, and said arcuate high friction surface element also rests on and is in frictional contact with said top ply adjacent the region of contact between said clamping element and said ply, means for rocking said arcuate element about its pivot, which is substantially at its axis of curvature, through a desired angle while both said elements rest on said top ply to cause an unconstrained portion of said ply to slide onto the upper surface of said clamping element so as to form a loop in said ply clamped between said two elements, said means for lowering and raising said clamping means being thereafter operated to raise said clamping element and ply ruffler together, thereby raising said clamped loop portion of said top ply off said stack.

6. Apparatus according to claim 5 in which said means for lowering and raising said clamping element and ply ruffler onto and off of the top of said stack comprises a pair of lift cams, means for rotating said lift cams, a pair of swing arms each having a cam follower mounted thereon contacting its respective lift cam for raising and lowering said arms in accordance with the rotational position of said cams, said swing arms being freely pivotable at one end in relation to a shaft and carrying said ply ruffler and clamping element adjacent their outer ends.

7. Apparatus according to claim 4 in which said means for lifting the remainder of said uppermost work piece off said stack and for supporting the separated work piece in a single layer above said stack comprise, separator bar means, means for moving said bar means over said stack between the remainder of said uppermost work piece and the top of the work piece immediately beneath said uppermost work piece, thereby separating said uppermost work piece from said stack, automatically retracting string grill means attached at one end to said separator bar means for supporting said uppermost work piece above the stack after being separated from it, said means for moving said bar means over said stack being adapted to return said bar means to its originl position after the separated work piece has been moved onto said conveyor means, thereby permitting said string grill to automatically retract at the same time.

8. Apparatus according to claim 7 in which said transfer mechanism comprises short endless belt means trained around at least two parallel but separated rollers, means for driving said belt means around said rollers in a desired direction, means for sequentially rocking said rollers with said belt means into two different positions about an axis between said rollers and parallel to each, the construction being such that in one of said positions said belt means frictionally contacts the separated work piece on said string grill means and pulls it part way off said grill means toward said conveyor means, while in the other of said positions it urges the leading edge of a partially pulled off work piece onto said conveyor means and causes it to be pulled the rest of the way off said string grill means and onto said conveyor means.

9. Apparatus according to claim 4 in which said transfer mechanism is mounted adjacent one end of said conveyor means and connected for movement therewith, said conveyor means comprising, a plurality of spaced apart endless belts which are longer than the length needed to convey said work pieces to said receiving station, each of said belts having a downwardly extending loop therein along its lower run, means for pulling each of said belt loops downwardly to take up any excess length and to apply a tension thereto to render said belts taut, roller means at opposite ends of the upper runs of said belts about which the latter are trained, said transfer mechanism being mounted adjacent one of said roller means, means for adjusting the distance between said roller means to thereby change the length of said upper runs and the position of said transfer mechanism according to the dimensions of the stack and the work pieces being separated from it, and means for moving said belts around said roller means in a desired direction to carry said work pieces to said receiving station.

10. Apparatus according to claim 9 in which there are bracket means to which one of said roller means is connected, said transfer mechanism being also connected to said bracket means, guide rails along which said bracket means are slidably mounted, and means for maintaining said bracket means at a desired position along said guide rails to position said transfer mechanism adjacent one edge of said stack.

11. In an apparatus according to claim 4 in which the conveyor means comprises moving endless belt means, and said means for lifting the remainder of said uppermost work piece off said stack comprises separator bar means, means for moving said separator bar means over said stack between the remainder of said uppermost work piece and the top of the work piece in the stack immediately beneath said uppermost work piece, and string grill means attached at one end to said separator bar means for supporting the work piece above the stack after separation therefrom, said transfer mechanism comprising, short endless belt means and two parallel but separated rollers, around which said belt means is trained, means for moving said belt around said rollers in a desired direction, means for rocking said belt means together with said rollers about an axis parallel to both rollers, first into one position and then into another position, the operation of said rocking means being so timed as to cause said last recited belt means to move into said one position to frictionally contact a work piece just after said work piece is fully separated from the stack and is lying on said string grill means, thereby pulling it part way off said string grill means, and thereafter to cause said transfer mechanism to move its belt means into said other position to urge the leading edge of a partially pulled off work piece onto said conveyor moving endless belt means thereby causing said work piece to be pulled the rest of the way off said string grill means onto said conveyor moving endless belt means.

12. Apparatus according to claim 4 in which there are means for raising above and for lowering onto said stack, said means for frictionally moving a portion of the top ply of the uppermost work piece off the stack without disturbing any of the plies beneath said top ply, said self-leveling stack support platform comprising a vertically movable platform for supporting said stack of work pieces, a motor connected to said platform for raising the same, and electrical switch and circuit means for controlling the actuation of said last mentioned motor according to the position in which said means for frictionally moving a portion of the top ply of said stack off of said stack is placed by said raising and lowering means.

13. In apparatus for automatically separating flat flexible material work pieces from a stack of such work pieces and for conveying separated work pieces to a receiving station for subsequent handling, the combination comprising, friction means for moving a portion of the top ply of the uppermost work piece off the stack without disturbing any of the plies beneath said top ply, means for lifting the remainder of said uppermost work piece off said stack and for supporting the separated work piece in a single layer above said stack, drive shaft means for operating said friction means, first electric motor means for rotating said drive shaft means, chain drive means for operating said work piece lifting and supporting means, second electric motor means for operating said chain drive means, and self-programming means for controlling the operation of said first and second motor means, said self-programming means comprising, cam operated switch means whose condition is controlled by the rotation of said drive shaft means, and additional electric switch means whose condition is controlled by the movement of said lifting and supporting means.

14. Apparatus for automatically separating flat flexible work pieces individually from a stack of such work pieces and for conveying the separated work pieces to a receiving station, said apparatus comprising: means for frictionally moving a portion of the uppermost work piece from the stack without disturbing any of the plies beneath said top ply, movable separator bar means cooperating with said frictional moving means for completing the separation of said uppermost work piece from the stack, string grill means connected to said separator bar means to move therewith and support the work pieces above the stack, after separation therefrom is completed by said bar means, a motor for moving said separator bar and string grill means, conveyor means for carrying the separated work pieces to the receiving station, transfer means cooperating with said string grill means and said conveyor means for moving work pieces, which have been completely separated from the stack, off said string grill means and onto said conveyor means, the cooperation between said frictional moving means, said transfer means, and said conveyor means being provided by control means comprising means connected between said motor and said separator bar means for determining the direction of movement of said separator bar means, and electrical circuit means operably connected to said frictional moving means, said motor, said means for determining the direction of movement of said separator bar means, and said transfer means for controlling the operation of each of these portions of the apparatus according to the position and direction of movement of said separator bar means.

15. Apparatus according to claim 14 wherein said means for determining the direction of movement of said separator means includes a solenoid and said circuit means comprises electrical circuitry connected to said solenoid and including a plurality of electrical relays and electrical switches for opening and closing portions of said circuitry at appropriate times, some of said switches being actuated in a predetermined and timed sequence according to the position and direction of movement of said separator bar means.

16. Apparatus according to claim 15 in which certain of said switches are manually operable, and there are triggering means connected to said separator bar means for operating the switches which are actuated according to the position and direction of movement of said separator bar means, said last mentioned switches being mounted in a predetermined order and spaced relationship in the path of movement of said triggering means so as to be operated in a predetermined and timed sequence.

References Cited

UNITED STATES PATENTS

| | | | |
|---|---|---|---|
| 1,394,202 | 10/1921 | Leumann | 271—19 X |
| 3,064,968 | 11/1962 | Starnes | 271—19 |
| 3,224,758 | 12/1965 | Siempelkamp | 271—69 X |
| 3,253,824 | 5/1966 | Southwell et al. | 271—19 |

FOREIGN PATENTS

| | | |
|---|---|---|
| 300,385 | 11/1928 | Great Britain. |

M. HENSON WOOD, JR., *Primary Examiner.*

ALLEN N. KNOWLES, *Examiner.*

J. N. ERLICH, *Assistant Examiner.*